US010595019B2

United States Patent
Chernyak et al.

(10) Patent No.: US 10,595,019 B2
(45) Date of Patent: Mar. 17, 2020

(54) NOISE SUPPRESSION FILTER PARAMETER ESTIMATION FOR VIDEO CODING

(71) Applicant: Futurewei Technologies, Inc., Plano, TX (US)

(72) Inventors: Roman Chernyak, Moscow (RU); Victor Stepin, Moscow (RU); Jose Alvarez, Santa Clara, CA (US); Shan Liu, San Jose, CA (US); Jiali Fu, Shenzhen (CN); Shan Gao, Shenzhen (CN); Haitao Yang, Shenzhen (CN); Yin Zhao, Shenzhen (CN); Jiantong Zhou, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/119,016

(22) Filed: Aug. 31, 2018

(65) Prior Publication Data
US 2019/0089953 A1    Mar. 21, 2019

Related U.S. Application Data

(60) Provisional application No. 62/561,100, filed on Sep. 20, 2017, provisional application No. 62/562,000, filed on Sep. 22, 2017.

(51) Int. Cl.
*H04N 19/117* (2014.01)
*H04N 19/60* (2014.01)
(Continued)

(52) U.S. Cl.
CPC ......... *H04N 19/117* (2014.11); *H04N 19/154* (2014.11); *H04N 19/176* (2014.11); *H04N 19/60* (2014.11); *H04N 19/96* (2014.11)

(58) Field of Classification Search
CPC .. H04N 19/102; H04N 19/117; H04N 19/126; H04N 19/134; H04N 19/189; H04N 19/82; H04N 19/85
(Continued)

(56) References Cited

U.S. PATENT DOCUMENTS 8,526,495 B2    9/2013    Liu et al.
9,049,452 B2    6/2015    Liu et al.
(Continued)

FOREIGN PATENT DOCUMENTS

WO    2018117895 A1    6/2018
WO    2018117896 A1    6/2018

OTHER PUBLICATIONS

"Series H: Audiovisual and Multimedia Systems, Infrastructure of audiovisual services—Coding of moving video, High efficiency video coding," ITU-T,11.265, Dec. 2016, 664 pages.
(Continued)

*Primary Examiner* — Dominic D Saltarelli
(74) *Attorney, Agent, or Firm* — Conley Rose, P.C.

(57) ABSTRACT

A mechanism of video coding is provided. The mechanism includes generating a reconstructed video frame. Noise suppression filter parameters are determined by partitioning the reconstructed video frame into blocks and matching the blocks to create patches. The noise suppression filter parameters are then determined based on the patches by creating a transformed matrix of patch frequencies. The noise suppression filter parameters include a noise estimation parameter that is a function of patch frequency. The noise suppression filter parameters are then employed to apply a noise suppression filter to the reconstructed video frame.

18 Claims, 8 Drawing Sheets

(51) Int. Cl.
*H04N 19/176* (2014.01)
*H04N 19/96* (2014.01)
*H04N 19/154* (2014.01)

(58) Field of Classification Search
USPC ............ 375/240.02, 240.08, 240.25, 240.29
See application file for complete search history.

(56) References Cited

U.S. PATENT DOCUMENTS

| | | | |
|---|---|---|---|
| 9,363,511 | B2 | 6/2016 | Zhang et al. |
| 9,510,012 | B2 | 11/2016 | Liu et al. |
| 9,769,472 | B2 | 9/2017 | Liu et al. |
| 9,788,019 | B2 | 10/2017 | Liu et al. |
| 9,813,726 | B2 | 11/2017 | Liu et al. |
| 2014/0086323 | A1 | 3/2014 | Chuang et al. |
| 2015/0172719 | A1 | 6/2015 | Guo et al. |
| 2015/0365692 | A1 | 12/2015 | Liu et al. |
| 2016/0142706 | A1 | 5/2016 | Chuang et al. |
| 2017/0098317 | A1* | 4/2017 | Qi .......................... G06K 9/34 |
| 2017/0272745 | A1 | 9/2017 | Liu et al. |
| 2017/0353730 | A1 | 12/2017 | Liu et al. |
| 2017/0374369 | A1 | 12/2017 | Chuang et al. |

OTHER PUBLICATIONS

Liu, S., et al., "Joint Temporal-Spatial Bit Allocation for Video Coding With Dependency," IEEE Transactions on Circuits and Systems for Video Technology, vol. 15, No. 1, Jan. 2005, pp. 15-26.
Liu, S., et al., "Hybrid global-local motion compensated frame interpolation for low bit rate video coding," J. Vis. Commun. Image R., vol. 14, 2003, pp. 61-79.
Liu, S., et al., "Global/Local Motion-Compensated Frame Interpolation for Low Bitrate Video," Image and Video Communications and Processing, vol. 3974, 2000, 12 pages.
Liu, S., et al., "Non-linear Motion-compensated Interpolation for Low Bit Rate Video," Applications of Digital Image Processing XXIII, vol. 4115, 2000, 11 pages.
Liu, S., et al., "MCI-embedded Motion Compensated Prediction for Quality Enhancement of Frame Interpolation," Multimedia Systems and Applications III, vol. 4209, Mar. 2001, 11 pages.
Liu, S., et al., "Joint Temporal-Spatial Rate Control with Approximating Rate-Distortion Models," Conference on Visual Communications and Image Processing, Jan. 20-25, 2002, 10 pages.
Liu, S., et al., Complexity Reduction of Joint Temporal-Spatial Bit Allocation Using R-D Models for Video Streaming, IEEE International Conference on Image Processing, Sep. 22-25, 2002, pp. 729-732.
Liu, S., et al., "Efficient MPEG-2 to MPEG-4 Video Transcoding," Conference on Image and Video Communications and Processing, Jan. 20-24, 2003, pp. 186-195.
Lou, J., et al., "Complexity and memory efficient GOP structures supporting VCR functionalities in H. 264/AVC," IEEE International Symposium on Circuits and Systems, 2008, pp. 636-639.
Lou J. et al., "Trick-Play Optimization for H.264 Video Decoding," Journal of Information Hiding and Multimedia Signal Processing, TR2010-076, Sep. 2010, 15 pages.
Liu, S., et al., "Joint Temporal-Spatial Rate Control for Adaptive Video Transcoding," IEEE International Conference on Multimedia and Expo, Jul. 6-9, 2003, 4 pages.
Zhang, X., et al., "Intra Mode Coding in HEVC Standard," Visual Communications and Image Processing, Jan. 2012, 6 pages.
Liu, S., et al., "Rectangular Partitioning for Intra Prediction in HEVC," Visual Communications and Image Processing, Jan. 2012, 6 pages.
Lai, P., et al., "Combined Temporal and Inter-layer Prediction for Scalable Video Coding using HEVC," Picture Coding Symposium, 2013, pp. 117-120.
Liu, S., et al., "Remove Partition Size NxN," JCTVC-D432, Jan. 20-28, 2011, 7 pages.
Liu, S., et al., "Evaluations and suggestions for TU representation," JCTVC-E083, WG11 No. m19597, Mar. 16-23, 2011, 8 pages.
Zhang, X., et al., "Method for deriving Chroma QP from Luma QP," JCTVC-F277, Jul. 14-22, 2011, 6 pages.
Liu, S., et al., "Rectangular (2NxN and Nx2N) Intra Prediction," JCTVC-G135, WG11 No. 21687, Nov. 21-30, 2011, 6 pages.
Zhang, X., et al., "Method and syntax for quantization matrices representation," JCTVC-G152, Nov. 21-30, 2011, 8 pages.
Liu, S., et al., "Support of ChromaQPOffset in HEVC," JCTVC-G509r1, Nov. 21-30, 2011, 8 pages.
Oudin, S., et al., "Harmonization of the prediction and partitioning mode binarization of P and B slices," JCTVC-31042, Nov. 21-30, 2011, 4 pages.
Cao, X., et al., "AFIG16 Unification of SDIP and NSQT," JCTVC-H0347, Feb. 1-10, 2012, 9 pages.
Zhang, X., et al., "Non-CE6: Intra mode coding with fixed length binarization," JCTVC-H0435, WG11 No. m23311, Feb. 1-10, 2012, 5 pages.
Kim, J., et al., "nonTE5: Assigning intra prediction mode to inter layer intra predicted blocks in enhance layer," JCTVC-L0239, Jan. 14-23, 2013, 5 pages.
Lai, P., et al., "SCE3.4 Generalized Combined Prediction," JCTVC-M0221, Apr. 18-26, 2013, 9 pages.
Lai, P., et al., "Non-SCE3.4: Simplified Generalized Combined Prediction," JCTVC-M0222, Apr. 2013, 10 pages.
Lai, P., et al., "Non-SCE3.4: Simplified Generalized Combined Prediction," JCTVC-M0222_r1, Apr. 18-26, 2013, 9 pages.
Seregin, V., et al., "Uni-prediction for combined inter mode," JCTVC-M0445, Apr. 18-26, 2013, 11 pages.
Xu, X., et al., "On unification of intra block copy and inter-picture motion compensation," JCTVC-Q0132, Jan. 9-17, 2014, 14 pages.
Xu, X., et al., "Non-CE2: Intra Bc merge mode with default candidates," JCTVC-50123, Oct. 17-24, 2014, 7 pages.
Xu, X., et al., "CE2 Test 12: Intra BC merge mode with default candidates," JCTVC-T0073, Feb. 10-18, 2015, 6 pages.
Sullivan, G., et al., "Overview of the High Efficiency Video Coding (HEVC) Standard," IEEE Transactions on Circuits and Systems for Video Technology, vol. 22, No. 12, Dec. 2012, pp. 1649-1668.
"Series H: Audiovisual and Multimedia Systems; Infrastructure of audiovisual services—Coding of moving video; High efficiency video coding," Recommendation ITU-T H.265, Apr. 2013, 317 pages.
Bjontegaard, G., et al., "Calculation of average PSNR differences between RD-curves," ITU-T Study Group 16, Question 6 in VCEG Meeting, Austin, Texas, USA, Apr. 2-4, 2001, 4 pages.
Mediatek, "Block partitioning structure for next generation video coding", ITU-T Study Group 16—Contribution 966, Doc. COM16-C966-E, Oct. 2015, 7 pages.

* cited by examiner

NOISE SUPPRESSION FILTER PARAMETER ESTIMATION FOR VIDEO CODING

CROSS-REFERENCE TO RELATED APPLICATIONS

This patent application claims the benefit of U.S. Provisional Patent Application No. 62/561,100, filed Sep. 20, 2017 by Roman Chernyak, et al., and titled "Sigma Estimation In Noise Suppressor Filter For Video Compression," and U.S. Provisional Patent Application No. 62/562,000, filed Sep. 22, 2017 by Jiali Fu, et al., and titled "In-Loop Filtering For Video Compression," both of which are hereby incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable.

SUMMARY

In an embodiment, the disclosure includes a method implemented in a computing device, the method comprising: generating, by a processor of the computing device, a reconstructed video frame; partitioning, by the processor, the reconstructed video frame into blocks; matching, by the processor, the blocks to create patches; creating, by the processor, a transformed matrix of patch frequencies; determining noise suppression filter parameters based on the transformed matrix of patch frequencies, the noise suppression filter parameters including a noise estimation parameter that is a function of patch frequency; generating a noise suppression filter based on the noise suppression filter parameters; and applying the noise suppression filter to the reconstructed video frame.

Optionally, in any of the preceding aspects, another implementation of the aspect includes, wherein the noise suppression filter parameters are determined according to:

$$g_{vw}^i(\Omega) = \frac{tf_{vw}^i(\Omega)^2}{tf_{vw}^i(\Omega)^2 + N_{vw}^i(\Omega)^2},$$

where $tf_{vw}^i(\Omega)$ is the transformed matrix of patch frequencies, i is a row index of the transformed matrix, $\Omega$ is a column index of the transformed matrix indicating patch frequency, v and w are patch frequency indices, $N_{vw}^i(\Omega)$ is the noise estimation parameter that is a function of patch frequency, and $g_{vw}^i(\Omega)$ are the noise suppression filter parameters.

Optionally, in any of the preceding aspects, another implementation of the aspect includes, wherein the noise estimation parameter is a monotonically increasing function of patch frequency.

Optionally, in any of the preceding aspects, another implementation of the aspect includes, wherein the noise estimation parameter is a monotonically non-increasing function of patch frequency.

Optionally, in any of the preceding aspects, another implementation of the aspect includes, wherein the noise estimation parameter is a function of patch frequency range.

Optionally, in any of the preceding aspects, another implementation of the aspect includes, wherein the noise estimation parameter is specified for each patch frequency index.

Optionally, in any of the preceding aspects, another implementation of the aspect includes, wherein the noise suppression filter is adaptively enabled based on data included in a bitstream in a Sequence Parameter Set (SPS), a Picture Parameter Set (PPS), a slice header, or combination thereof.

Optionally, in any of the preceding aspects, another implementation of the aspect includes, wherein the reconstructed video frame is further partitioned into coding tree units (CTUs), and a search range employed when matching the blocks to create patches is limited to remain inside a boundary of a corresponding CTU.

In an embodiment, the disclosure includes an apparatus comprising: a receiver configured to receive a bitstream; and a processor coupled to the receiver, the processor configured to: generate a reconstructed video frame from data in the bitstream; partition the reconstructed video frame into blocks; match the blocks to create patches; create a transformed matrix of patch frequencies; determine noise suppression filter parameters based on the transformed matrix of patch frequencies, the noise suppression filter parameters including a noise estimation parameter that is a function of patch frequency; generate a noise suppression filter based on the noise suppression filter parameters; and apply the noise suppression filter to the reconstructed video frame.

Optionally, in any of the preceding aspects, another implementation of the aspect includes, wherein the noise suppression filter parameters are determined according to:

$$g_{vw}^i(\Omega) = \frac{tf_{vw}^i(\Omega)^2}{tf_{vw}^i(\Omega)^2 + N_{vw}^i(\Omega)^2},$$

where $tf_{vw}^i(\Omega)$ is the transformed matrix of patch frequencies, i is a row index of the transformed matrix, $\Omega$ is a column index of the transformed matrix indicating patch frequency, v and w are patch frequency indices, $N_{vw}^i(\Omega)$ is the noise estimation parameter that is a function of patch frequency, and $g_{vw}^{i}(\Omega)$ are the noise suppression filter parameters.

Optionally, in any of the preceding aspects, another implementation of the aspect includes, wherein the noise estimation parameter is a monotonically increasing function of patch frequency.

Optionally, in any of the preceding aspects, another implementation of the aspect includes, wherein the noise estimation parameter is a monotonically non-increasing function of patch frequency.

Optionally, in any of the preceding aspects, another implementation of the aspect includes, wherein the noise estimation parameter is specified for each patch frequency index.

Optionally, in any of the preceding aspects, another implementation of the aspect includes, wherein the noise suppression filter is adaptively enabled based on data included in the bitstream in a Sequence Parameter Set (SPS), a Picture Parameter Set (PPS), a slice header, or combination thereof.

Optionally, in any of the preceding aspects, another implementation of the aspect includes, wherein the processor is further configured to partition the reconstructed video frame into coding tree units (CTUs), and wherein a search range employed when matching the blocks to create patches is limited to remain inside a boundary of a corresponding CTU.

In an embodiment, the disclosure includes a non-transitory computer readable medium comprising a computer program product for use by a decoder, the computer program product comprising computer executable instructions stored on the non-transitory computer readable medium such that when executed by a processor cause the decoder to: receive a bitstream; generate a reconstructed video frame from data in the bitstream; partition the reconstructed video frame into blocks; match the blocks to create patches; create a transformed matrix of patch frequencies; determine noise suppression filter parameters based on the transformed matrix of patch frequencies, the noise suppression filter parameters including a noise estimation parameter that is a function of patch frequency; generate a noise suppression filter based on the noise suppression filter parameters; and apply the noise suppression filter to the reconstructed video frame.

Optionally, in any of the preceding aspects, another implementation of the aspect includes, wherein the noise suppression filter parameters are determined according to:

$$g_{vw}^{i}(\Omega) = \frac{tf_{vw}^{i}(\Omega)^2}{tf_{vw}^{i}(\Omega)^2 + N_{vw}^{i}(\Omega)^2},$$

where $tf_{vw}^{i}(\Omega)$ is the transformed matrix of patch frequencies, i is a row index of the transformed matrix, $\Omega$ is a column index of the transformed matrix indicating patch frequency, v and w are patch frequency indices, $N_{vw}^{i}(\Omega)$ is the noise estimation parameter that is a function of patch frequency, and $g_{vw}^{i}(\Omega)$ are the noise suppression filter parameters.

Optionally, in any of the preceding aspects, another implementation of the aspect includes, wherein the noise estimation parameter is a function of patch frequency.

Optionally, in any of the preceding aspects, another implementation of the aspect includes, wherein the noise suppression filter is adaptively enabled based on data included in the bitstream in a Sequence Parameter Set (SPS), a Picture Parameter Set (PPS), a slice header, or combination thereof.

Optionally, in any of the preceding aspects, another implementation of the aspect includes, wherein the instructions further cause the processor to partition the reconstructed video frame into coding tree units (CTUs), and wherein a search range employed when matching the blocks to create patches is limited to remain inside a boundary of a corresponding CTU.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
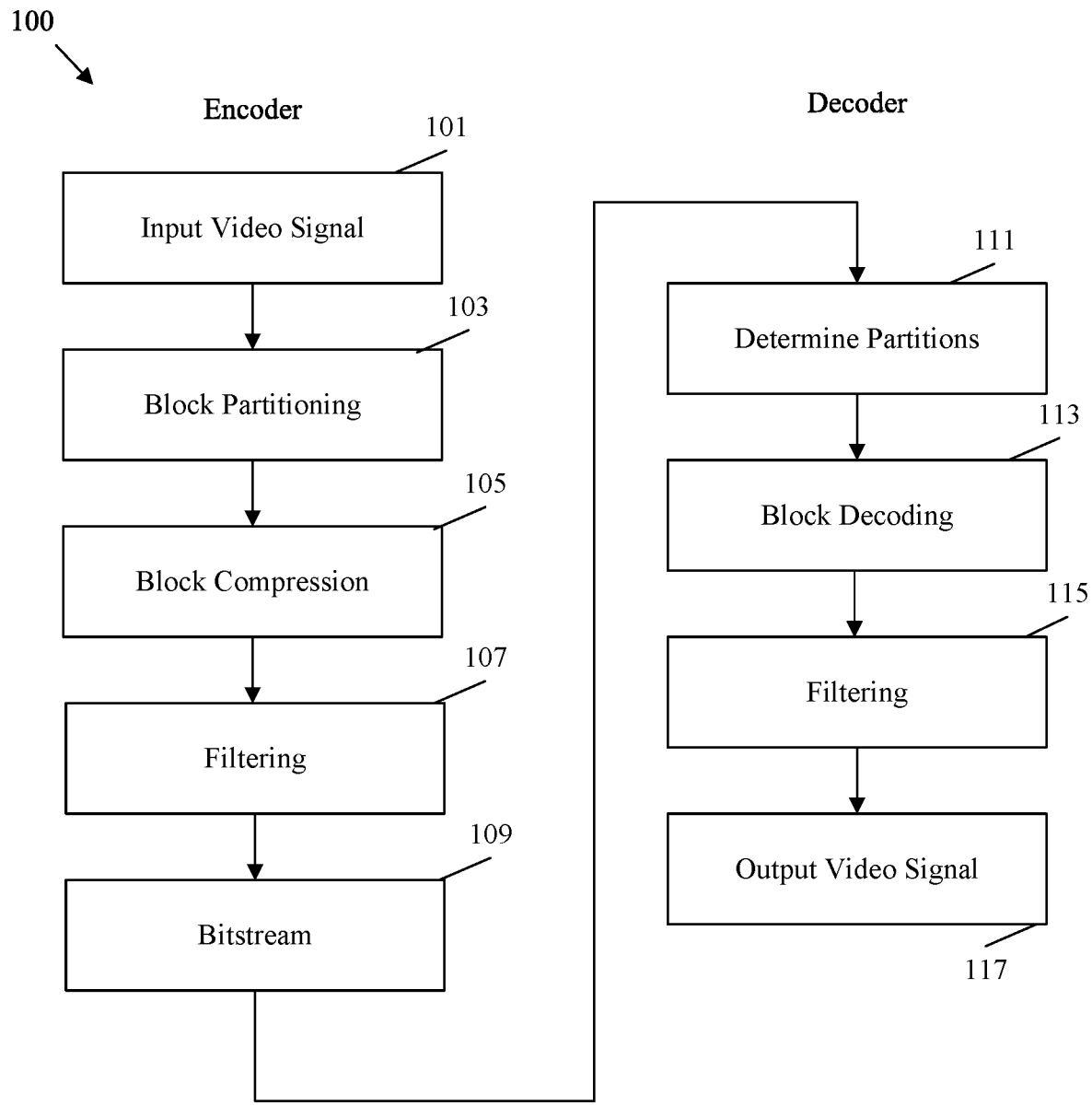
FIG. 1 is a flowchart of an example method of coding a video signal.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Video coding schemes subdivide video signals into image frames, and then subdivide the image frames into various types of blocks. The image blocks are then compressed. This approach may create visual artifacts when the compressed video signal is reconstructed and displayed. For example, blocky shapes can be artificially added by the image compression process. This is known as blocking, and generally occurs at block partition boundaries. Also, non-linear signal dependent rounding error, known as quantization noise, may be artificially added to a compressed image. Various filters may be employed to correct for such artifacts. The filters may be applied to reconstructed frames in post processing. Post processing occurs after significant portions of the compressed video signal have been reconstructed and immediately prior to display to a user. The filters may also be applied as part of the compression/decompression process by employing a mechanism called in-loop filtering. In-loop filtering is a filtering scheme that applies filters to reconstructed video images during the encoding and/or decoding process to support more accurate compression between related images. For example, inter-prediction encodes an image frame based on a previous and/or subsequent image frame. At an encoder, a compressed image is reconstructed and filtered via in-loop filtering so that the reconstructed image provides a more accurate image for use in encoding previous/subsequent image frame(s) via inter-prediction. At a decoder, a compressed image is reconstructed and filtered via in-loop filtering both to create a more accurate image for viewing by an end user and to support more accurate inter-prediction. In-loop filtering employs several filters such as a deblocking filter, a sample adaptive offset (SAO) filter, and an adaptive loop filter. In-loop filtering can also include a noise suppression filter. A noise suppression filter is configured to mitigate quantization noise and may, in some configurations, mitigate sensor noise associated with a video capture device. Applying the noise suppression filter may improve prediction and corresponding compression accuracy. However, in some cases the noise suppression filter may also increase coding complexity and increase resulting file size (e.g., decrease effectiveness of compression). Hence, the utility of the noise suppression filter varies for different cases. As such, global application of the noise suppression filter may not be desirable. Also, the noise suppression filter operates partially in a frequency domain. Signal noise generally occurs at high frequencies. Hence, increased control of the noise suppression filter at particular frequencies may be desirable.

Disclosed herein are various mechanisms to improve control of the noise suppression filter. The noise suppression filter operates on a reconstructed frame by determining noise suppression filter parameters for the frame and then applying a filter, such as a Wiener filter, based on the determined parameters. Specifically, the noise suppression filter parameters are determined by matching blocks from the reconstructed frame to make patches. The patches are transformed into a frequency domain and grouped into a matrix based on corresponding frequencies. The noise suppression filter parameters are then determined based on data from the matrix as well as a noise estimation parameter. In the present disclosure, the noise estimation parameter may be implemented as a function of patch frequency. By defining the noise estimation parameter based on frequency, the strength of the filter can be adjusted based on frequency. For example, the filter may provide greater filtration for high frequency components and lesser filtration for lower frequency components. As such, a noise suppression filter operating according to a frequency based noise estimation parameter can be targeted to provide a higher quality image due to increased filtering effectiveness without increasing resulting file size and/or without increasing processing time. Further, the disclosure includes signaling mechanisms to adaptively activate and/or deactivate the noise suppression filter for image luma components, chroma components, or combinations thereof. Also, the block matching process employs a search range that can be bounded by coding tree units (CTUs) in the reconstructed frame. These mechanisms may provide greater control over the noise suppression filter, and hence may be employed to balance video coding quality with file size. These and other examples are discussed in more detail with respect to the FIGS. below.

FIG. 1 is a flowchart of an example method 100 of coding a video signal. Specifically, a video signal is encoded at an encoder. The encoding process compresses the video signal by employing various mechanisms to reduce the video file size. A smaller file size allows the compressed video file to be transmitted toward a user, while reducing associated bandwidth overhead. The decoder then decodes the compressed video file to reconstruct the original video signal for display to an end user. The decoding process generally mirrors the encoding process to allow the decoder to consistently reconstruct the video signal.

At step 101, the video signal is input into the encoder. For example, the video signal may be an uncompressed video file stored in memory. As another example, the video file may be captured by a video capture device, such as a video camera, and encoded to support live streaming of the video. The video file may include both an audio component and a video component. The video component contains a series of image frames that, when viewed in a sequence, gives the visual impression of motion. The frames contain pixels that are expressed in terms of light, referred to herein as luma components, and color, which is referred to as chroma components. In some examples, the frames may also contain depth values to support three dimensional viewing.

At step 103, the video is partitioned into blocks. Partitioning includes subdividing the pixels in each frame into square and/or rectangular blocks for compression. For example, coding trees may be employed to divide and then recursively subdivide blocks until configurations are achieved that support further encoding. As such, the blocks may be divided from coding tree units in High Efficiency Video Coding (HEVC) (also known as H.265 and MPEG-H Part 2). For example, luma components of a frame may be subdivided until the individual blocks contain relatively homogenous lighting values. Further, chroma components of a frame may be subdivided until the individual blocks contain relatively homogenous color values. Accordingly, partitioning mechanisms vary depending on the content of the video frames.

At step 105, various compression mechanisms are employed to compress the image blocks partitioned at step 103. For example, inter-prediction and/or intra-prediction may be employed. Inter-prediction is designed to take advantage of the fact that objects in a common scene tend to appear in successive frames. Accordingly, a block depicting an object in a reference frame need not be repeatedly described in subsequent frames. Specifically, an object, such as a table, may remain in a constant position over multiple frames. Hence the table need only be described once and subsequent frames can refer back to the reference frame. Pattern matching mechanisms may be employed to match objects over multiple frames. Further, moving objects may be represented across multiple frames, for example due to object movement or camera movement. As a particular example, video may show an automobile that moves across the screen over multiple frames. Motion vectors can be employed to describe such movement. A motion vector is a two-dimensional vector that provides an offset from the coordinates of an object in a frame to the coordinates of the object in a reference frame. As such, inter-prediction can encode an image block in a current frame as a set of motion vectors indicating an offset from a corresponding block in a reference frame.

Intra-prediction encodes blocks in a common frame. Intra-prediction takes advantage of the fact that luma and chroma components tend to cluster in a frame. For example, a patch of green in a portion of a tree tends to be positioned adjacent to similar patches of green. Intra-prediction employs multiple directional prediction modes (e.g., thirty three in HEVC), a planar mode, and a direct current (DC) mode. The directional modes indicate that a current block is similar/the same as a neighbor block in a corresponding direction. Planar mode indicates that a series of blocks along a row (e.g., a plane) can be interpolated based on neighbor blocks at the edges of the row. Planar mode, in effect, indicates a smooth transition of light/color across a row by employing a relatively constant slope in changing values. DC mode is employed for boundary smoothing and indicates that a block is similar/the same as an average value associated with all the neighbor blocks associated with the angular directions of the directional prediction modes. Accordingly, intra-prediction blocks can represent image blocks as various relational prediction mode values instead of the actual values. Further, inter-prediction blocks can represent image blocks as motion vector values instead of the actual values. In either case, the prediction blocks may not exactly represent the image blocks in some cases. Any differences are stored in residual blocks. Transforms may be applied to the residual blocks to further compress the file.

At step 107, various filtering techniques may be applied. In HEVC, the filters are applied according to an in-loop filtering scheme. The block based prediction discussed above may result in the creation of blocky images at the decoder. Further, the block based prediction scheme may encode a block and then reconstruct the encoded block for later use as a reference block. The in-loop filtering scheme iteratively applies noise suppression filters, de-blocking filters, adaptive loop filters, and sample adaptive offset (SAO) filters to the blocks/frames. These filters mitigate such blocking artifacts so that the encoded file can be accurately reconstructed. Further, these filters mitigate artifacts in reconstructed reference blocks so that artifacts are less likely to create additional artifacts in subsequent blocks that are encoded based on the reconstructed reference blocks. For example, a frame can be encoded and then reconstructed for use as a reference frame for further frames. The filtering of step 107 can be applied to the reconstructed reference frames before other frames are encoded based on the reconstructed reference frames. This mitigates coding artifacts in the reconstructed reference frames, and hence provides for improved coding of further blocks/frames that are encoded based on the reference blocks/frames.

Once the video signal has been partitioned, compressed, and filtered, the resulting data is encoded in a bitstream at step 109. The bitstream includes the data discussed above as well as any signaling data desired to support proper video signal reconstruction at the decoder. For example, such data may include partition data, prediction data, residual blocks, and various flags providing coding instructions to the decoder. The bitstream may be stored in memory for transmission toward a decoder upon request. The bitstream may also be broadcast and/or multicast toward a plurality of decoders. The creation of the bitstream is an iterative process (as is the creation of a video stream from a coded bitstream). Accordingly, steps 101, 103, 105, 107, and 109 may occur continuously and/or simultaneously over many frames and blocks. Further, steps 111, 113, 115, and 117 may occur continuously and/or simultaneously over many frames and blocks. The order shown in FIG. 1 is presented for clarity and ease of discussion, and is not intended to limit the video coding process to a particular order.

The decoder receives the bitstream and begins the decoding process at step 111. Specifically, the decoder employs an entropy decoding scheme to convert the bitstream into corresponding syntax and video data. The decoder employs the syntax data from the bitstream to determine the partitions for the frames at step 111. The partitioning should match the results of block partitioning at step 103. Entropy encoding/decoding as employed in step 111 is now described. The encoder makes many choices during the compression process, such as selecting block partitioning schemes from several possible choices based on the spatial positioning of values in the input image(s). Signaling the exact choices may employ a large number of bins. As used herein, a bin is a binary value that is treated as a variable (e.g., a bit value that may vary depending on context). Entropy coding allows the encoder to discard any options that are clearly not viable for a particular case, leaving only a set of allowable options. Each allowable option is then assigned a code word. The length of the code words is based on the number of allowable options (e.g., one bin for two options, two bins for three to four options, etc.). The encoder then encodes the code word for the selected option. This scheme reduces the size of the code words as the code words are only as big as desired to uniquely indicate a selection from a small sub-set of allowable options as opposed to uniquely indicating the selection from a potentially large set of all possible options. The decoder then decodes the selection by determining the set of allowable options in a similar manner to the encoder. By determining the set of allowable options, the decoder can read the code word and determine the selection made by the encoder.

At step 113, the decoder performs block decoding. Specifically, the decoder employs reverse transforms to generate residual blocks. Then the decoder employs the residual blocks and corresponding prediction blocks to reconstruct the image blocks according to the partitioning. The prediction blocks may include both intra-prediction blocks and inter-prediction blocks as generated at the encoder at step 105. The reconstructed image blocks are then positioned into frames of a reconstructed video signal according to the partitioning data determined at step 111. Syntax for step 113 may also be signaled in the bitstream via entropy coding as discussed above.

At step 115, filtering is performed on the frames of the reconstructed video signal in a manner similar to step 107 at the encoder. For example, noise suppression filters, de-blocking filters, adaptive loop filters, and SAO filters may be applied to the frames to remove blocking, noise, and other artifacts. Once the frames are filtered, the video signal can be output to a display at step 117 for viewing by an end user.

Method 100 may employ a noise suppression filter at the encoder for filtering reconstructed reference frames at step 107. The noise suppression filter may also be used at the decoder for filtering reconstructed frames at step 115 prior to presenting such frames to an end user via a display at step 115. A noise suppression filter is a filter applied to frames in both the pixel domain and the frequency domain. The noise suppression filter is applied based on an analysis of the reconstructed frame and syntax from a codec, which can either be signaled in the bitstream or predefined. The noise suppression filter does not require access to data from the original image in order to filter the reconstructed image. The present disclosure includes various techniques for improving the effectiveness of the noise suppression filter as well as adaptively controlling the application of the filter. Hence the present disclosure is directed to improvements to steps 107 and 115 of method 100.

Figure 2:
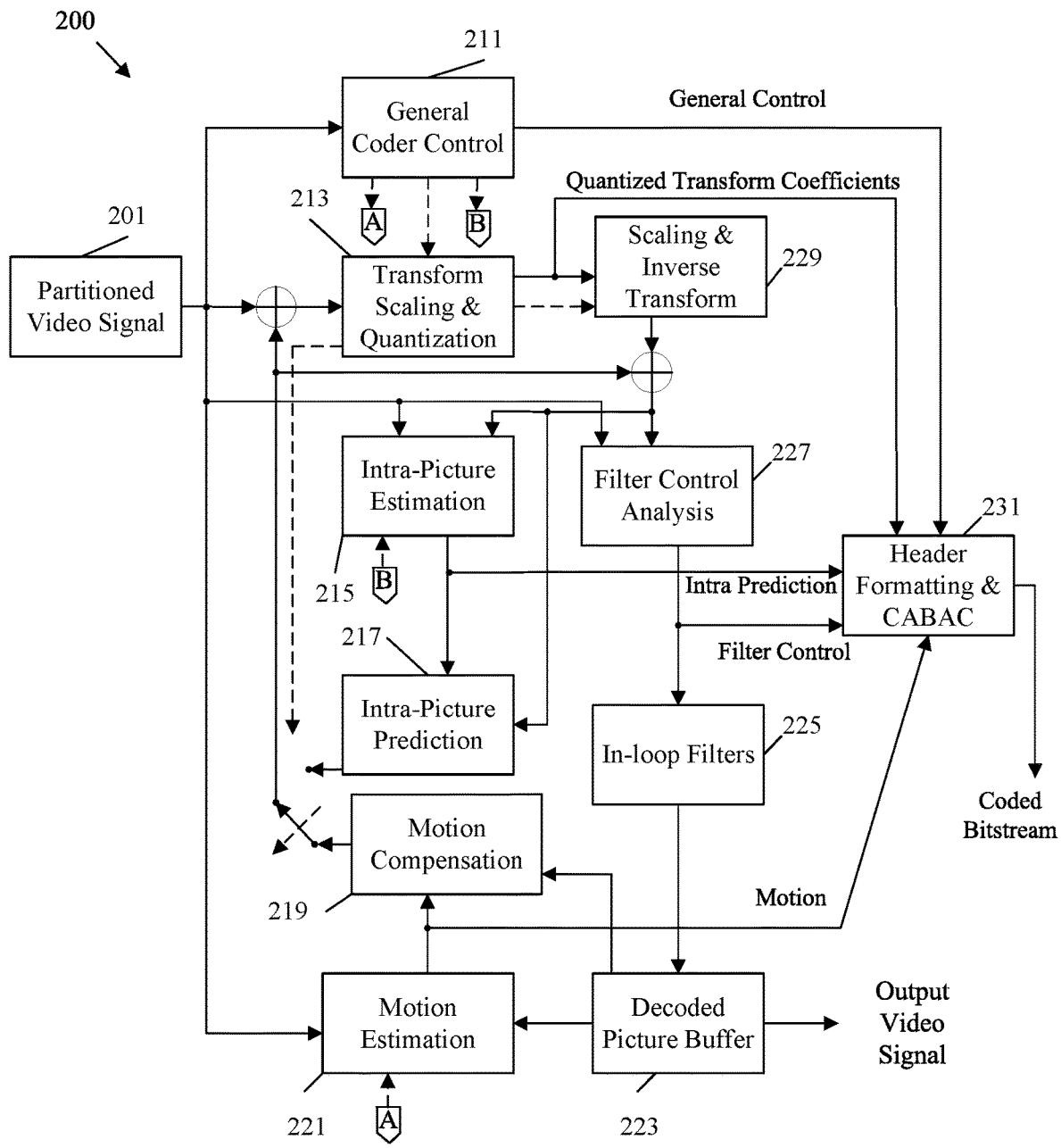
FIG. 2 is a schematic diagram of an example coding and decoding (codec) system for video coding.

FIG. 2 is a schematic diagram of an example codec system 200 for video coding. Specifically, codec system 200 provides functionality to support the implementation of method 100. Codec system 200 is generalized to depict components employed in both an encoder and a decoder. Codec system 200 receives and partitions a video signal as discussed with respect to steps 101 and 103 in method 100, which results in a partitioned video signal 201. Codec system 200 then compresses the partitioned video signal 201 into a coded bitstream when acting as an encoder as discussed with respect to steps 105, 107, and 109 in method 100. When acting as a decoder codec system 200 generates an output video signal from the bitstream as discussed with respect to steps 111, 113, 115, and 117 in method 100. The codec system 200 includes a general coder control component 211, a transform scaling and quantization component 213, an intra-picture estimation component 215, an intra-picture prediction component 217, a motion compensation component 219, a motion estimation component 221, a scaling and inverse transform component 229, a filter control analysis component 227, an in-loop filters component 225, a decoded picture buffer component 223, and a header formatting and Context adaptive binary arithmetic coding (CABAC) component 231. Such components are coupled as shown. In FIG. 2, black lines indicate movement of data to be encoded/decoded while dashed lines indicate movement of control data that controls the operation of other components. The components of codec system 200 may all be present in the encoder. The decoder may include a subset of the components of codec system 200. For example, the decoder may include the intra-picture prediction component 217, the motion compensation component 219, the scaling and inverse transform component 229, the in-loop filters component 225, and the decoded picture buffer component 223. These components are now described.

The partitioned video signal 201 is a captured video stream that has been partitioned into blocks of pixels by a coding tree. A coding tree employs various split modes to subdivide a block of pixels into smaller blocks of pixels. These blocks can then be further subdivided into smaller blocks. The blocks may be referred to as nodes on the coding tree. Larger parent nodes are split into smaller child nodes. The number of times a node is subdivided is referred to as the depth of the node/coding tree. The nodes may be referred to as coding tree units (CTUs) and the divided blocks are referred to as coding units (CUs) in some cases. The split modes may include a binary tree (BT), triple tree (TT), and a quad tree (QT) employed to partition a node into two, three, or four child nodes, respectively, of varying shapes depending on the split modes employed. The partitioned video signal 201 is forwarded to the general coder control component 211, the transform scaling and quantization component 213, the intra-picture estimation component 215, the filter control analysis component 227, and the motion estimation component 221 for compression.

The general coder control component 211 is configured to make decisions related to coding of the images of the video sequence into the bitstream according to application constraints. For example, the general coder control component 211 manages optimization of bitrate/bitstream size versus reconstruction quality, which may be referred to as rate distortion optimization. Such decisions may be made based on storage space/bandwidth availability and image resolution requests. The general coder control component 211 also manages buffer utilization in light of transmission speed to mitigate buffer underrun and overrun issues. To manage these issues, the general coder control component 211 manages partitioning, prediction, and filtering by the other components. For example, the general coder control component 211 may dynamically increase compression complexity to increase resolution and increase bandwidth usage or decrease compression complexity to decrease resolution and bandwidth usage. Hence, the general coder control component 211 controls the other components of codec system 200 to balance video signal reconstruction quality with bit rate concerns. The general coder control component 211 creates control data, which controls the operation of the other components. The control data is also forwarded to the header formatting and CABAC component 231 to be encoded in the bitstream to signal parameters for decoding at the decoder.

The partitioned video signal 201 is also sent to the motion estimation component 221 and the motion compensation component 219 for inter-prediction. A frame or slice of the partitioned video signal 201 may be divided into multiple video blocks. Motion estimation component 221 and the motion compensation component 219 perform inter-predictive coding of the received video block relative to one or more blocks in one or more reference frames to provide temporal prediction. Codec system 200 may perform multiple coding passes, e.g., to select an appropriate coding mode for each block of video data.

Motion estimation component 221 and motion compensation component 219 may be highly integrated, but are illustrated separately for conceptual purposes. Motion estimation, performed by motion estimation component 221, is the process of generating motion vectors, which estimate motion for video blocks. A motion vector, for example, may indicate the displacement of a prediction unit (PU) of a video block relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, codec system 200 may calculate values for sub-integer pixel positions of reference pictures stored in decoded picture buffer 223. For example, video codec system 200 may interpolate values of one-quarter pixel positions, one-eighth pixel positions, or other fractional pixel positions of the reference picture. Therefore, motion estimation component 221 may perform a motion search relative to the full pixel positions and fractional pixel positions and output a motion vector with fractional pixel precision. The motion estimation component 221 calculates a motion vector for a PU of a video block in an inter-coded slice by comparing the position of the PU to the position of a predictive block of a reference picture. Motion estimation component 221 outputs the calculated motion vector as motion data to header formatting and CABAC component 231 for encoding and motion to the motion compensation component 219.

Motion compensation, performed by motion compensation component 219, may involve fetching or generating the predictive block based on the motion vector determined by motion estimation component 221. Again, motion estimation component 221 and motion compensation component 219 may be functionally integrated, in some examples. Upon receiving the motion vector for the PU of the current video block, motion compensation component 219 may locate the predictive block to which the motion vector points. A residual video block is then formed by subtracting pixel values of the predictive block from the pixel values of the current video block being coded, forming pixel difference values. In general, motion estimation component 221 performs motion estimation relative to luma components, and motion compensation component 219 uses motion vectors calculated based on the luma components for both chroma components and luma components. The predictive block and residual block are forwarded to transform scaling and quantization component 213.

The partitioned video signal 201 is also sent to intra-picture estimation component 215 and intra-picture prediction component 217. As with motion estimation component 221 and motion compensation component 219, intra-picture estimation component 215 and intra-picture prediction component 217 may be highly integrated, but are illustrated separately for conceptual purposes. The intra-picture estimation component 215 and intra-picture prediction component 217 intra-predict a current block relative to blocks in a current frame, as an alternative to the inter-prediction performed by motion estimation component 221 and motion compensation component 219 between frames, as described above. In particular, the intra-picture estimation component 215 determines an intra-prediction mode to use to encode a current block. In some examples, intra-picture estimation component 215 selects an appropriate intra-prediction mode to encode a current block from multiple tested intra-prediction modes. The selected intra-prediction modes are then forwarded to the header formatting and CABAC component 231 for encoding.

For example, the intra-picture estimation component 215 calculates rate-distortion values using a rate-distortion analysis for the various tested intra-prediction modes, and selects the intra-prediction mode having the best rate-distortion characteristics among the tested modes. Rate-distortion analysis generally determines an amount of distortion (or error) between an encoded block and an original unencoded block that was encoded to produce the encoded block, as well as a bitrate (e.g., a number of bits) used to produce the encoded block. The intra-picture estimation component 215 calculates ratios from the distortions and rates for the various encoded blocks to determine which intra-prediction mode exhibits the best rate-distortion value for the block. In addition, intra-picture estimation component 215 may be configured to code depth blocks of a depth map using a depth modeling mode (DMM) based on rate-distortion optimization (RDO). It should be noted that the motion estimation component 221 may also employ RDO when selecting and/or encoding motion vectors (MVs) for inter-prediction in a manner similar to selection of intra-prediction modes for intra-prediction by the intra-picture estimation component 215.

The intra-picture prediction component 217 may generate a residual block from the predictive block based on the selected intra-prediction modes determined by intra-picture estimation component 215. The residual block includes the difference in values between the predictive block and the original block, represented as a matrix. The residual block is then forwarded to the transform scaling and quantization component 213. The intra-picture estimation component 215 and the intra-picture prediction component 217 may operate on both luma and chroma components.

The transform scaling and quantization component 213 is configured to further compress the residual block. The transform scaling and quantization component 213 applies a transform, such as a discrete cosine transform (DCT), a discrete sine transform (DST), or a conceptually similar transform, to the residual block, producing a video block comprising residual transform coefficient values. Wavelet transforms, integer transforms, sub-band transforms or other types of transforms could also be used. The transform may convert the residual information from a pixel value domain to a transform domain, such as a frequency domain. The transform scaling and quantization component 213 is also configured to scale the transformed residual information, for example based on frequency. Such scaling involves applying a scale factor to the residual information so that different frequency information is quantized at different granularities, which may affect final visual quality of the reconstructed video. The transform scaling and quantization component 213 is also configured to quantize the transform coefficients to further reduce bit rate. The quantization process may reduce the bitdepth associated with some or all of the coefficients. The degree of quantization may be modified by adjusting a quantization parameter. In some examples, the transform scaling and quantization component 213 may then perform a scan of the matrix including the quantized transform coefficients. The quantized transform coefficients are forwarded to the header formatting and CABAC component 231 to be encoded in the bitstream.

The scaling and inverse transform component 229 applies a reverse operation of the transform scaling and quantization component 213 to support motion estimation. The scaling and inverse transform component 229 applies inverse scaling, transformation, and/or quantization to reconstruct the residual block in the pixel domain, e.g., for later use as a reference block which may become a predictive block for another current block. The motion estimation component 221 and/or motion compensation component 219 may calculate a reference block by adding the residual block back to a corresponding predictive block for use in motion estimation of a later block/frame. Filters are applied to the reconstructed reference blocks to mitigate artifacts created during scaling, quantization, and transform. Such artifacts could otherwise cause inaccurate prediction (and create additional artifacts) when subsequent blocks are predicted.

The filter control analysis component 227 and the in-loop filters component 225 apply the filters to the residual blocks and/or to reconstructed image blocks. For example, the reverse transformed residual block from scaling and inverse transform component 229 may be combined with a corresponding prediction block from intra-picture prediction component 217 and/or motion compensation component 219 to reconstruct the original image block. The filters may then be applied to the reconstructed image block. In some examples, the filters may instead be applied to the residual blocks. As with other components in FIG. 2, the filter control analysis component 227 and the in-loop filters component 225 are highly integrated and may be implemented together, but are depicted separately for conceptual purposes. Filters applied to the reconstructed reference blocks are applied to particular spatial regions and include multiple parameters to adjust how such filters are applied. The filter control analysis component 227 analyzes the reconstructed reference blocks to determine where such filters should be applied and sets corresponding parameters. Such data is forwarded to the header formatting and CABAC component 231 as filter control data for encoding. The in-loop filters component 225 applies such filters based on the filter control data. The filters may include a deblocking filter, a noise suppression filter, a SAO filter, and an adaptive loop filter. Such filters may be applied in the spatial/pixel domain (e.g., on a reconstructed pixel block) or in the frequency domain, depending on the example.

When operating as an encoder, the filtered reconstructed image block, residual block, and/or prediction block are stored in the decoded picture buffer 223 for later use in motion estimation as discussed above. When operating as a decoder, the decoded picture buffer 223 stores and forwards the reconstructed and filtered blocks toward a display as part of an output video signal. The decoded picture buffer 223 may be any memory device capable of storing prediction blocks, residual blocks, and/or reconstructed image blocks.

The header formatting and CABAC component 231 receives the data from the various components of codec system 200 and encodes such data into a coded bitstream for transmission toward a decoder. Specifically, the header formatting and CABAC component 231 generates various headers to encode control data, such as general control data and filter control data. Further, prediction data, including intra-prediction and motion data, as well as residual data in the form of quantized transform coefficient data are all encoded in the bitstream. The final bitstream includes all information desired by the decoder to reconstruct the original partitioned video signal 201. Such information may also include intra-prediction mode index tables (also referred to as code word mapping tables), definitions of encoding contexts for various blocks, indications of a most probable intra-prediction mode, an indication of partition information, etc. Such data may be encoded by employing entropy coding. For example, the information may be encoded by employing context adaptive variable length coding (CAVLC), CABAC, syntax-based context-adaptive binary arithmetic coding (SBAC), probability interval partitioning entropy (PIPE) coding, or another entropy coding technique. Following the entropy coding, the coded bitstream may be transmitted to another device (e.g., a video decoder) or archived for later transmission or retrieval.

As discussed with respect to FIG. 1. above, the present disclosure relates to various techniques for improving the effectiveness of a noise suppression filter as well as adaptively controlling the application of the filter. The in-loop filters component 225 employs a noise suppression filter. Hence the present disclosure is directed to improvements to in-loop filters component 225 in an encoder and/or a decoder. For example, the present disclosure includes mechanisms to link the strength of the noise suppression filter in the in-loop filters component 225 to the frequency. This improves the effectiveness of the noise suppression filter, and hence improves the performance of the in-loop filters component 225. Further, the present disclosure includes mechanisms for increased control of the noise suppression filter, and hence improves the flexibility and functionality of the in-loop filters component 225.

Figure 3:
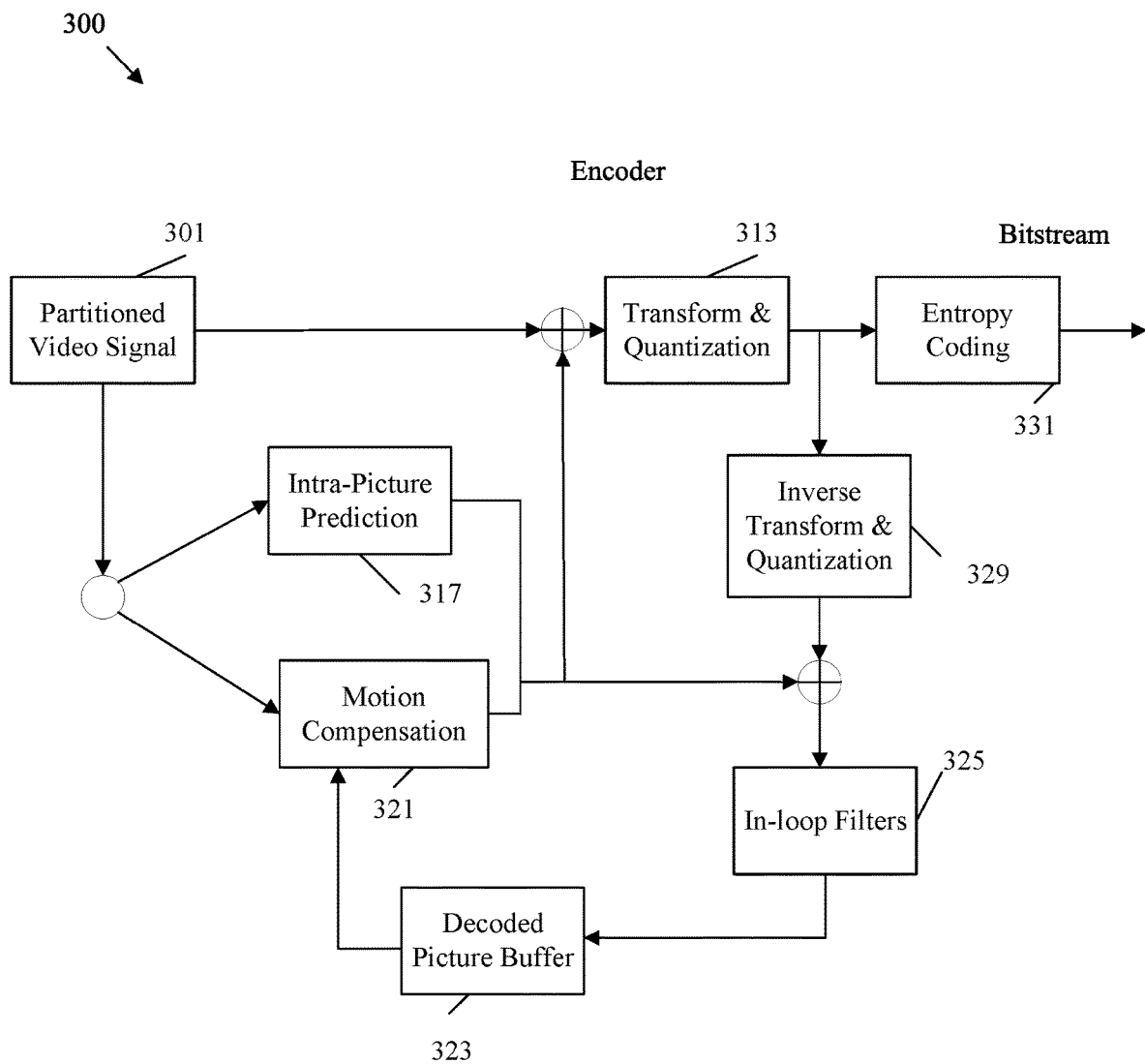
FIG. 3 is a block diagram illustrating an example video encoder that may implement a noise suppression filter.

FIG. 3 is a block diagram illustrating an example video encoder 300 that may implement a noise suppression filter. Video encoder 300 may be employed to implement the encoding functions of codec system 200 and/or implement steps 101, 103, 105, 107, and/or 109 of method 100. Encoder 300 partitions an input video signal, resulting in a partitioned video signal 301, which is substantially similar to the partitioned video signal 201. The partitioned video signal 301 is then compressed and encoded into a bitstream by components of encoder 300.

Specifically, the partitioned video signal 301 is forwarded to an intra-picture prediction component 317 for intra-prediction. The intra-picture prediction component 317 may be substantially similar to intra-picture estimation component 215 and intra-picture prediction component 217. The partitioned video signal 301 is also forwarded to a motion compensation component 321 for inter-prediction based on reference blocks in a decoded picture buffer 323. The motion compensation component 321 may be substantially similar to motion estimation component 221 and motion compensation component 219. The prediction blocks and residual blocks from the intra-picture prediction component 317 and the motion compensation component 321 are forwarded to a transform and quantization component 313 for transform and quantization of the residual blocks. The transform and quantization component 313 may be substantially similar to the transform scaling and quantization component 213. The transformed and quantized residual blocks and the corresponding prediction blocks (along with associated control data) are forwarded to an entropy coding component 331 for coding into a bitstream. The entropy coding component 331 may be substantially similar to the header formatting and CABAC component 231.

The transformed and quantized residual blocks and/or the corresponding prediction blocks are also forwarded from the transform and quantization component 313 to an inverse transform and quantization component 329 for reconstruction into reference blocks for use by the motion compensation component 321. The inverse transform and quantization component 329 may be substantially similar to the scaling and inverse transform component 229. In-loop filters in an in-loop filters component 325 are also applied to the residual blocks/frames and/or reconstructed reference blocks/frames, depending on the example. The in-loop filters component 325 may be substantially similar to the filter control analysis component 227 and the in-loop filters component 225. The in-loop filters component 325 may include multiple filters, including a noise suppression filter. The filtered blocks are then stored in a decoded picture buffer 323 for use as reference blocks by the motion compensation component 321. The decoded picture buffer 323 may be substantially similar to the decoded picture buffer 223.

The in-loop filters component 325 includes a noise suppression filter. Hence the present disclosure is directed to improvements to in-loop filters component 325 in an encoder 300. For example, the present disclosure includes mechanisms to link the strength of the noise suppression filter in the in-loop filters component 325 to the frequency. This improves the effectiveness of the noise suppression filter, and hence improves the performance of the in-loop filters component 325. Further, the present disclosure includes mechanisms for increased control of the noise suppression filter, and hence improves the flexibility and functionality of the in-loop filters component 325.

Figure 4:
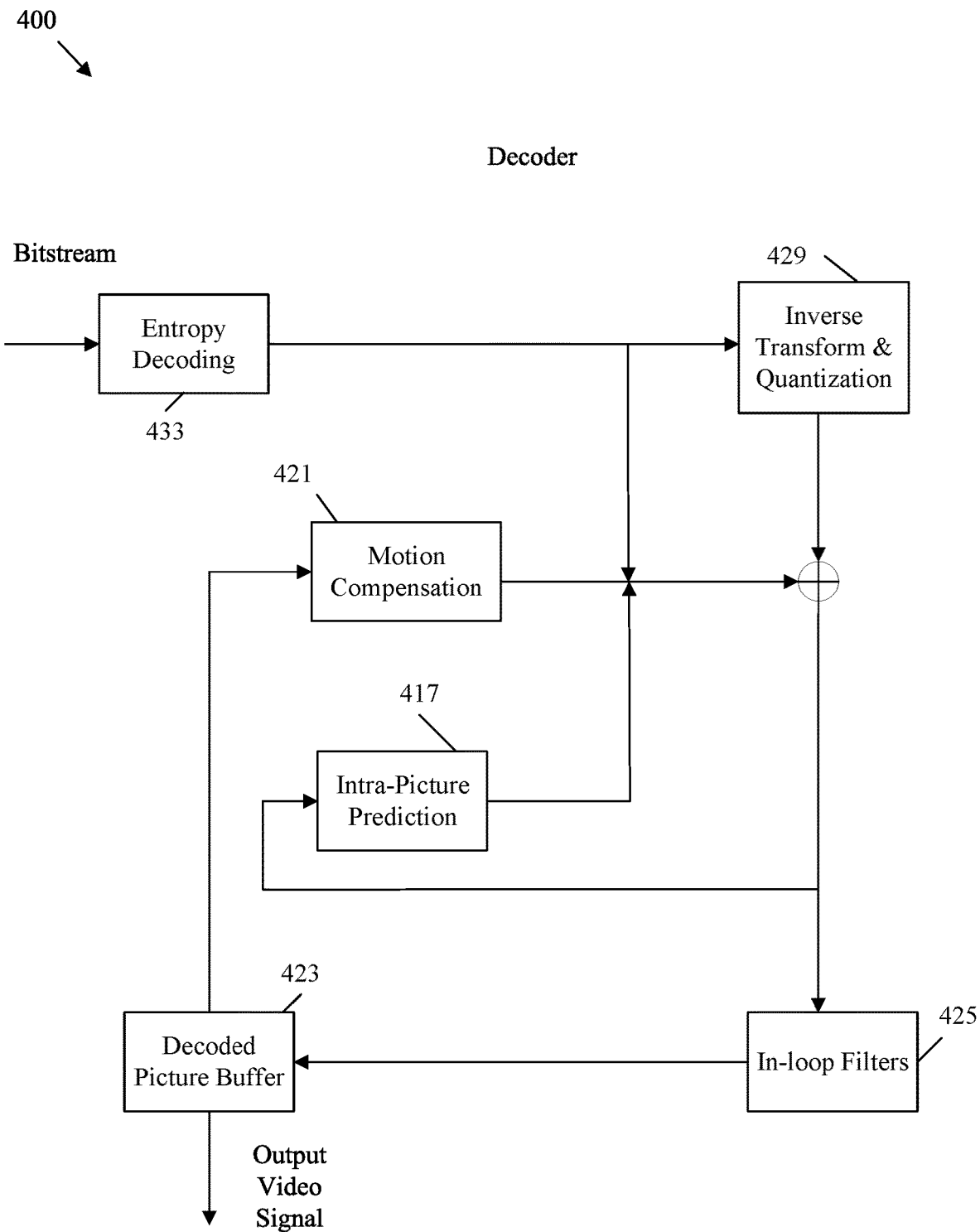
FIG. 4 is a block diagram illustrating an example video decoder that may implement a noise suppression filter.

FIG. 4 is a block diagram illustrating an example video decoder 400 that may implement a noise suppression filter. Video decoder 400 may be employed to implement the decoding functions of codec system 200 and/or implement steps 111, 113, 115, and/or 117 of method 100. Decoder 400 receives a bitstream, for example from an encoder 300, and generates a reconstructed output video signal based on the bitstream for display to an end user.

The bitstream is received by an entropy decoding component 433. The entropy decoding component 433 performs the reverse function of the entropy encoding component 331. The entropy decoding component 433 is configured to implement an entropy decoding scheme, such as CAVLC, CABAC, SBAC, PIPE coding or other entropy coding techniques. For example, the entropy decoding component 433 may employ header information to provide a context to interpret additional data encoded as code words in the bitstream. The decoded information includes any desired information to decode the video signal, such as general control data, filter control data, partition information, motion data, prediction data, and quantized transform coefficients from residual blocks. The quantized transform coefficients are forwarded to an inverse transform and quantization component 429 for reconstruction into residual blocks. The inverse transform and quantization component 429 may be substantially similar to the inverse transform and quantization component 329.

The reconstructed residual blocks and/or prediction blocks are forwarded to intra-picture prediction component 417 for reconstruction into image blocks based on intra-prediction operations. Intra-picture prediction component 417 may be substantially similar to intra-picture prediction component 317, but operates in reverse. Specifically, the intra-picture prediction component 417 employs prediction modes to locate a reference block in a frame and applies a residual block to the result to reconstruct intra-predicted image blocks. The reconstructed intra-predicted image blocks and/or the residual blocks and corresponding inter-prediction data are forwarded to a decoded picture buffer component 423 via in-loop filters component 425, which may be substantially similar to decoded picture buffer component 323 and in-loop filters component 325, respectively. The in-loop filters component 425 filters the reconstructed image blocks, residual blocks, and/or prediction blocks, and such information is stored in the decoded picture buffer component 423. Reconstructed image blocks from decoded picture buffer component 423 are forwarded to a motion compensation component 421 for inter-prediction. The motion compensation component 421 may be substantially similar to motion compensation component 321, but may operate in reverse. Specifically, the motion compensation component 421 employs motion vectors from a reference block to generate a prediction block and applies a residual block to the result to reconstruct an image block. The resulting reconstructed blocks may also be forwarded via the in-loop filters component 425 to the decoded picture buffer component 423. The decoded picture buffer component 423 continues to store additional reconstructed image blocks, which can be reconstructed into frames via the partition information. Such frames may also be placed in a sequence. The sequence is output toward a display as a reconstructed output video signal.

The in-loop filters component 425 includes a noise suppression filter. Hence the present disclosure is directed to improvements to in-loop filters component 425 in a decoder 400. For example, the present disclosure includes mechanisms to link the strength of the noise suppression filter in the in-loop filters component 425 to the frequency. This improves the effectiveness of the noise suppression filter, and hence improves the performance of the in-loop filters component 425. Further, the present disclosure includes mechanisms for increased control of the noise suppression filter, and hence improves the flexibility and functionality of the in-loop filters component 425.

Figure 5:
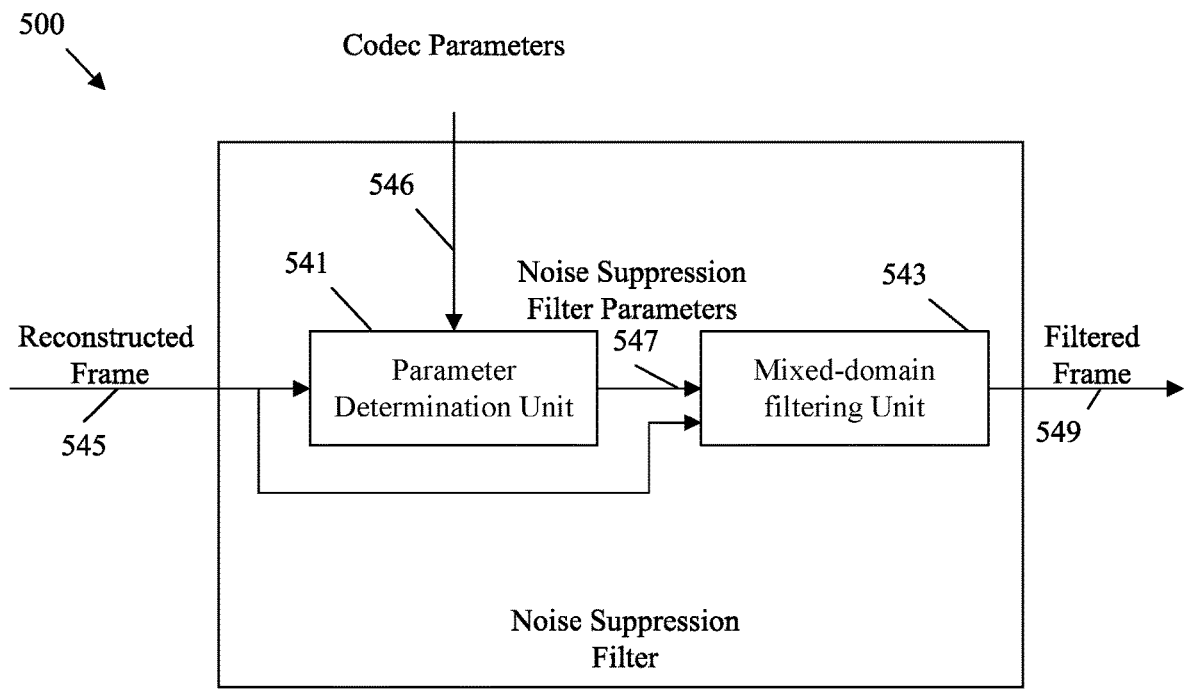
FIG. 5 is a schematic diagram illustrating an example of a noise suppression filter.

FIG. 5 is a schematic diagram illustrating an example of a noise suppression filter 500, which may implement noise suppression filtering in step 107 and/or 115 in method 100. Further, the noise suppression filter 500 may be implemented as a noise suppression filter in in-loop filters 225, 325, and/or 425, depending on the example. For example, the noise suppression filter 500 can be implemented to filter reconstructed video frames at an encoder 300 for use as reference frames for encoding of further frames via inter-prediction. As another example, the noise suppression filter 500 can be implemented to filter reconstructed video frames at a decoder 400 prior to presentation of a video sequence via a display.

The noise suppression filter 500 is a filter configured to suppress signal noise in a reconstructed video frame 545 by analyzing the reconstructed video frame 545 in both the pixel domain and the frequency domain. The noise suppression filter 500 receives a reconstructed video frame 545 and codec parameters 546. The noise suppression filter 500 employs a parameter determination unit 541 configured to determine noise suppression filter parameters 547 based on the reconstructed video frame 545 and codec parameters 546. The noise suppression filter 500 also includes a mixed domain filtering unit 543 configured to employ the noise suppression filter parameters 547 to filter the reconstructed video frame 545 and generate a filtered frame 549. The filtered frame 549 can be either used as a reference frame in an encoder or displayed to a user at a decoder, depending on the example.

The reconstructed video frame 545 is a frame that has been encoded and then reconstructed. Hence, the reconstructed video frame 545 may include some amount of added signal noise. When operating at a decoder, the original frame is unavailable for use by the noise suppression filter 500. When operating at an encoder, the noise suppression filter 500 should mimic the operating of a corresponding filter at a decoder. Hence, the noise suppression filter 500 may not employ the original un-encoded frame when filtering the reconstructed video frame 545. Instead, the parameter determination unit 541 employs the reconstructed video frame 545 and the codec parameters 546 to determine noise suppression filter parameters 547 that can then be used to filter the reconstructed video frame 545. The codec parameters 546 may be predefined, signaled in the bitstream between the encoder and the decoder, or a combination of both. The codec parameters 546 may include a quantization noise parameter, which is sometimes referred to herein as N. The quantization noise parameter is a value that indicates expected quantization noise caused by the encoding process.

The parameter determination unit 541 partitions the reconstructed video frame 545 into blocks. The parameter determination unit 541 also matches the blocks to create patches. The parameter determination unit 541 then creates a matrix including values based on patch frequencies indicating value changes in the patches. Values include luma values and/or chroma values of the blocks. Patch frequency, as used herein, indicates a location of a certain element in a patch matrix, as expressed in a frequency domain, across blocks in a patch. The parameter determination unit 541 may also apply transforms to the matrix as discussed in greater detail with respect to the FIGS. below. The parameter determination unit 541 then determines the noise suppression filter parameters 547 by applying the quantization noise parameter to the values contained in the matrix.

The mixed domain filter unit 543 is a component configured to apply a filter to the reconstructed video frame 545 based on the noise suppression filter parameters 547 determined by the parameter determination unit 541. For example, the mixed domain filter unit 543 may generate a Wiener filter based on the noise suppression filter parameters 547 and then apply the Wiener filter to the reconstructed video frame 545. The mixed domain filter unit 543 may also filter the reconstructed video frame 545 in the pixel domain. By applying the relevant filter(s) to the reconstructed video frame 545 based on the noise suppression filter parameters 547, the mixed domain filter unit 543 generates a filtered frame 549. The filtered frame 549 can then be displayed to an end user via a display at a decoder and/or employed as a reference frame for further encoding at an encoder, depending on the example.

As shown above, the noise suppression filter parameters 547 have a significant effect on the filters applied by the mixed domain filter unit 543. The present disclosure relates to improvements in the determination of the noise suppression filter parameters 547. As an example, the parameter determination unit 541 can determine the noise suppression filter parameters 547 applying Equation 1 below.

$$g_{vw}^{i}=\text{Func}(tf_{vw}^{i},N), \qquad \text{Equation 1}$$

where $g_{vw}^{i}$, are the noise suppression filter parameters as a function of i, v, and w, i is a row index of a transformed patch matrix, v and w are patch frequency indices, $tf_{vw}^{i}$ is the transformed matrix of patch frequencies, func is some function, and N is the quantization noise parameter. As a specific example, Equation 1 can be expanded to create Equation 2 below.

$$g_{vw}^{i}(\Omega) = \frac{tf_{vw}^{i}(\Omega)^2}{tf_{vw}^{i}(\Omega)^2 + N^2}, \qquad \text{Equation 2}$$

where $g_{vw}^{i}(\Omega)$ are the noise suppression filter parameters as a further function of $\Omega$, $tf_{vw}^{i}(\Omega)$ is the transformed matrix of patch frequencies indexed by $\Omega$, $\Omega$ is a column index of the transformed matrix indicating patch frequency, and other terms are as discussed above.

As shown in Equations 1 and 2, the quantization noise parameter N may not be a function of frequency. Accordingly, applying Equations 1 and 2 results in noise suppression filter parameters 547 that are not a function of frequency. As such, Equations 1 and 2 apply the quantization noise parameter N equally across all frequencies $\Omega$. However, noise generally occurs at higher frequencies and a usable signal generally occurs at lower frequencies. Accordingly, in an example, the noise estimation parameter is set as a function of patch frequency. This results in Equations 3 and 4 below.

$$g_{vw}^{i} = \text{Func}(tf_{vw}^{i}, N_{vw}^{i}), \qquad \text{Equation 3}$$

$$g_{vw}^{i}(\Omega) = \frac{tf_{vw}^{i}(\Omega)^2}{tf_{vw}^{i}(\Omega)^2 + N_{vw}^{i}(\Omega)^2}, \qquad \text{Equation 4}$$

where $tf_{vw}^{i}(\Omega)$ is the transformed matrix of patch frequencies, i is a row index of the transformed matrix, $\Omega$ is a column index of the transformed matrix indicating patch frequency, v and w are patch frequency indices, $N_{vw}^{i}(\Omega)$ is the noise estimation parameter that is a function of patch frequency, and $g_{vw}^{i}(\Omega)$ are the noise suppression filter parameters. By applying Equations 3 and 4, the parameter determination unit 541 can create noise suppression filter parameters 547 that vary the noise estimation parameter based on frequency, and hence apply a filter, such as a Wiener filter, to greater and/or lesser degrees based on the frequency of the signal associated with the reconstructed video frame 545.

The noise estimation parameter may be associated with frequency by various functions. In one example, the noise estimation parameter may be set as a monotonically increasing function of frequency. As a specific example, the noise estimation parameter may be set as a linear function of frequency, such as:

$$N_{vw}^{i}(\Omega)=a\times\Omega+b, \qquad \text{Equation 5}$$

where $N_{vw}^{i}(\Omega)$ is the noise estimation parameter that is a function of frequency, $\Omega$ is a column index of the transformed matrix indicating frequency, a and b are real and/or rational numbers, and a is greater than zero. As another specific example, the noise estimation parameter may be set as an exponential function of frequency, such as:

$$N_{vw}^{i}(\Omega)=e^{\Omega}, \qquad \text{Equation 6}$$

where e is the base of the natural logarithm and other terms are as defined above. It should be noted that any real or rational constant greater than one can be used instead of e.

In another example, the noise estimation parameter may be set as a monotonically non-increasing function of frequency. As a specific example, the noise estimation parameter may be set as a linear non-increasing function of frequency, such as:

$$N_{vw}^{i}(\Omega)=c\times\Omega+b, \qquad \text{Equation 7}$$

where $N_{vw}^{i}(\Omega)$ is the noise estimation parameter that is a function of frequency, $\Omega$ is a column index of the transformed matrix indicating frequency, c and b are real and/or rational numbers, and c is less than or equal to zero. As another specific example, the noise estimation parameter may be set as a logarithmic function of frequency, such as:

$$N_{vw}^{i}(\Omega)=\ln(\Omega), \qquad \text{Equation 8}$$

where ln is a natural logarithm and other terms are as defined above. As yet another specific example, the noise estimation parameter may be set as a constant, such as:

$$N_{vw}^{i}(\Omega)=C, \qquad \text{Equation 9}$$

where C is a constant value and other terms are as defined above.

In another example, the relation between the noise estimation parameter and the frequency can be changed within the defined domain of the frequencies. For example, the domain of the frequencies may be split into M ranges, where M is a predefined or signaled value. Specifically, the noise estimation parameter can have different functions across different frequency ranges according to [0, $r_1$); [$r_1$, $r_2$); . . . ; [$r_{M-1}$, $r_M$) where r indicates frequency range boundaries indexed according to a number of ranges M. An example implementation of varying the noise estimation parameter function relative to frequency over the defined domain of the frequencies is shown in Table 1 below:

TABLE 1

| Number of range | Range ($\Omega$) | Function ($N_{vw}^{i}(\Omega)$) |
|---|---|---|
| 1 | [0, 10) | Linear increasing |
| 2 | [10, 100) | Constant |
| 3 | [100, ∞) | Exponential function |

In the example shown in Table 1, the noise estimation parameter includes a first function (e.g., linear increasing) over a first range (e.g., zero to ten), a second function (e.g., constant) over a second range (e.g., ten to one hundred), and a third function (e.g., exponential function) over a third range (e.g., one hundred and above). While Table 1 depicts example ranges and functions for purposes of clarity of discussion, one of skill in the art will recognize that ranges and functions can be tailored for a particular application, and hence the example of Table 1 is capable of significant variation by modifying functions, range boundaries, and range groups.

In another example, the relation between the noise estimation parameter and the frequency can be specified explicitly for each K frequency. Accordingly, the noise estimation parameter can include a different function at each frequency value (e.g., index K). An example implementation is shown in Table 2 below:

TABLE 2

| Frequency ($\Omega$) | Function ($N_{vw}^i(\Omega)$) |
|---|---|
| 1 | h(qp) |
| 2 | 2 × h(qp) |
| 3 | 3 × h(qp) |
| 4 | 4 × h(qp) |

In the example shown in Table 2, each frequency index is associated with a corresponding explicitly defined function. In this example, each frequency index is some function h of a quantization parameter (QP), for example as received as a codec parameter 546.

The QP value may vary from block to block. For example, when there is only one matching block for a current block, the QP value may be equal to the QP value for the matching block. As another example, when more than one block matches a current block, the QP value can be the average QP value of all the matching blocks. As a further example, the QP value can be the QP value of the spatial distance between a current block and a nearest matching block. As a further example, the QP value can be the median QP value of all the matching blocks for a current block. As a further example, the QP value can be the biggest QP value of all the matching blocks for a current block. As a further example, the QP value can be the smallest QP value of all the matching blocks for a current block. As a further example, the QP value can the QP value of smallest SAD, sum of square errors (SSE), mean square error (MSE), highest absolute difference (HAD), etc. of all matching blocks for a current block.

It should also be noted that the noise suppression filter 500 can be adaptively enabled based on data included in a bitstream in a Sequence Parameter Set (SPS), a Picture Parameter Set (PPS), a slice header, or combination thereof. For example, the noise suppression filter 500 can be adaptively enabled/disabled for particular reconstructed frames 545, or sub-portions thereof, by data included in the codec parameters 546 via the bitstream.

For example, the noise suppression filter 500 can be turned on and/or off by flags in a slice header in the bitstream. As a particular example, a single one bit flag may be employed to indicate noise suppression filter 500 usage for a corresponding slice of the reconstructed video frame 545 for both luma a chroma components. Such syntax is shown in Table 3 below:

TABLE 3

| slice_segment_header( ) { | Descriptor |
|---|---|
| ... | |
| if(sps_ns_filter_enabled_flag) { | |
|    slice_ns_filter_enabled_flag | ue(v) |
|    if (!slice_ns_filter_enabled_flag) { | |
|      log2_ ns_block_size_minus3 | ue(v) |
|      ns_app_map | ae(v)/ ue(v) |
|    } | |
| }... | |
| } | |

In the example of Table 3, the slice_ns_filter_enabled_ flag indicates application of the noise suppression filter 500 for luma and chroma components of a slice. The slice_ns_filter_enabled_flag may be set to zero to specify that the noise suppression filter 500 is adaptively enabled for luma and chroma components in a current slice. The slice_ns_filter_enabled_flag can also be set to one to specify that the noise suppression filter 500 is enabled for luma and chroma components in the current slice. The slice_ns_filter_enabled_flag can be set to two to specify that the noise suppression filter 500 is disabled for luma and chroma components in the current slice. This is applied when a sps_ns_filter_enabled_flag in the SPS indicates the noise suppression filter 500 is available for a sequence of frames. The log2_ns_block_size_minus3 data indicates the size of blocks employed in block matching during application of the noise suppression filter 500. The ns_app_map can specify the set of flags which are related to each ns block for luma and chroma components in the current slice. The block size used by the noise suppression filter 500 may or may not be the same as Coding Tree Unit (CTU) and/or Coding Unit (CU) size employed in partitioning at steps 103 and/or 111 in method 100.

In another example, a PPS flag in the bitstream can be employed to signal noise suppression filter 500 usage as shown in Table 4 below:

TABLE 4

| slice_segment_header( ) { | Descriptor |
|---|---|
| ... | |
| if(pps_ns_filter_enabled_flag) { | |
|    slice_ns_filter_enabled_flag | ue(v) |
|    if (!slice_ns_filter_enabled_flag) { | |
|      log2_ ns_block_size_minus3 | ue(v) |
|      ns_app_map | ae(v)/ ue(v) |
|    } | |
| }... | |
| } | |

The pps_ns_filter_enabled_flag indicates the noise suppression filter 500 is available for the current frame. The slice_ns_filter_enabled_flag may be set to zero to specify that the noise suppression filter 500 is adaptively enabled for luma and chroma components in a current slice. The slice_ns_filter_enabled_flag can also be set to one to specify that the noise suppression filter 500 is enabled for luma and chroma components in the current slice. The slice_ns_filter_enabled_flag can be set to two to specify that the noise suppression filter 500 is disabled for luma and chroma components in the current slice. When slice_ns_filter_enabled_flag is not present, the flag can be inferred to be equal to zero. The log2_ns_block_size_minus3 may specify the noise suppression filter 500 block size for luma and chroma components in the current slice. The ns_app_map can specify the set of flags which are related to each ns block for luma and chroma components in the current slice.

In another example, the noise suppression filter 500 filter flags can be indicated for luma components only, in which case the noise suppression filter 500 is not used for chroma components. Syntax for this example are shown for SPS and PPS dependent signaling in Tables 5 and 6, respectively:

TABLE 5

| slice_segment_header( ) { | Descriptor |
|---|---|
| ... | |
| if(sps_ns_filter_enabled_flag) { | |
|    slice_ns_filter_enabled_flag | ue(v) |

TABLE 5-continued

| slice_segment_header( ) { | Descriptor |
|---|---|
|     if (!slice_ns_filter_enabled_flag) { | |
|       log2_ ns_block_size_minus3 | ue(v) |
|       ns_app_map | ae(v)/ ue(v) |
|     } | |
|   }... | |
| } | |

TABLE 6

| slice_segment_header( ) { | Descriptor |
|---|---|
| .... | |
| if(pps_ns_filter_enabled_flag) { | |
|   slice_ns_filter_enabled_flag | ue(v) |
|   if (!slice_ns_filter_enabled_flag) { | |
|     log2_ ns_block_size_minus3 | ue(v) |
|     ns_app_map | ae(v)/ ue(v) |
|   } | |
| }... | |
| } | |

The syntax disclosed in Tables 5-6 may have the same meaning as corresponding syntax in Tables 3-4, respectively, but only apply to luma components.

In another example, the noise suppression filter 500 can be turned on and/or off by employing two one bit flags to indicate usage for luma and chroma components, respectively. Syntax of such an example is shown in Tables 7 and 8 below for SPS and PPS dependent signaling, respectively:

TABLE 7

| slice_segment_header( ) { | Descriptor |
|---|---|
| ... | |
| if(sps_ns_filter_enabled_flag) { | |
|   slice_ns_filter_luma_enabled_flag | ue(v) |
|   if(slice_ns_filter_luma_enabled_flag) { | |
|     log2_ ns_luma_block_size_minus3 | ue(v) |
|     ns_luma_app_map | ae(v)/ ue(v) |
|   } | |
|   slice_ns_filter_chroma_enabled_flag | ue(v) |
|   if(slice_ns_filter_chroma_enabled_flag) { | |
|     log2_ ns_chroma_block_size_minus3 | ue(v) |
|     ns_chroma_app_map | ae(v)/ ue(v) |
|   } | |
| }... | |
| } | |

TABLE 8

| slice_segment_header( ) { | Descriptor |
|---|---|
| ... | |
| if(pps_ns_filter_enabled_flag) { | |
|   slice_ns_filter_luma_enabled_flag | ue(v) |
|   if(slice_ns_filter_luma_enabled_flag) { | |
|     log2_ ns_luma_block_size_minus3 | ue(v) |
|     ns_luma_app_map | ae(v)/ ue(v) |
|   } | |
|   slice_ns_filter_chroma_enabled_flag | ue(v) |
|   if(slice_ns_filter_chroma_enabled_flag) { | |
|     log2_ ns_chroma_block_size_minus3 | ue(v) |
|     ns_chroma_app_map | ae(v)/ ue(v) |
|   } | |
| }... | |
| } | |

The sps_ns_filter_enabled_flag and pps_ns_filter_enabled_flag indicate whether the noise suppression filter 500 is available for the sequence or the frame, respectively. The slice_ns_filter_luma_enabled_flag and the slice_ns_filter_chroma_enabled_flag indicate whether the noise suppression filter 500 is available for the luma and chroma components, respectively, for the current slice. As an example, such flags can be set to zero, one, and two to adaptively apply the noise suppression filter 500 for the slice, apply the noise suppression filter 500 for the slice, and disable the noise suppression filter 500 for the slice, respectively. Such flags can be inferred to be zero when not present in the bitstream. The log2_ns_luma_block_size_minus3 and log2_ns_chroma_block_size_minus3 items may indicate the block size for luma and chroma components, respectively, as discussed in the examples above. The ns_luma_app_map and the ns_chroma_app_map can be employed to specify the set of flags which are related to each noise suppression filter 500 block for the luma components and the chroma components, respectively, in a current slice.

In yet another example, the noise suppression filter 500 can be turned on and/or off by employing two one bit flags to indicate usage for luma and chroma components, respectively. However, the chroma flag can be dependent on the luma flag. Syntax for this example are shown for SPS and PPS dependent signaling in Tables 9 and 10, respectively:

TABLE 9

| slice_segment_header( ) { | Descriptor |
|---|---|
| ... | |
| if(sps_ns_filter_enabled_flag) { | |
|   slice_ns_filter_luma_enabled_flag | ue(v) |
|   if(slice_ns_filter_luma_enabled_flag) { | |
|     log2_ns_luma_block_size_minus3 | ue(v) |
|     ns_luma_app_map | ae(v)/ ue(v) |
|     slice_ns_filter_chroma_enabled_flag | ue(v) |
|   } | |
|   if(slice_ns_filter_chroma_enabled_flag) { | |
|     log2_ns_chroma_block_size_minus3 | ue(v) |
|     ns_chroma_app_map | ae(v)/ ue(v) |
|   } | |
| }... | |
| } | |

TABLE 10

| slice_segment_header( ) { | Descriptor |
|---|---|
| ... | |
| if(pps_ns_filter_enabled_flag) { | |
|   slice_ns_filter_luma_enabled_flag | ue(v) |
|   if(slice_ns_filter_luma_enabled_flag) { | |
|     log2_ ns_luma_block_size_minus3 | ue(v) |
|   ns_luma_app_map | ae(v)/ ue(v) |
|     slice_ns_filter_chroma_enabled_flag | ue(v) |
|   } | |
|   if(slice_ns_filter_chroma_enabled_flag) { | |
|     log2_ ns_chroma_block_size_minus3 | ue(v) |
|   ns_chroma_app_map | ae(v)/ ue(v) |
|   } | |
| }... | |
| } | |

The syntax in Tables 9-10 is substantially similar to the syntax of Tables 7-8. However, in Tables 9-10, the chroma filter flag is only parsed when the luma filter flag is evaluated as true. Hence, the application of the noise suppression filter 500 to chroma components is dependent on application of the noise suppression filter 500 to luma components.

Figure 6:
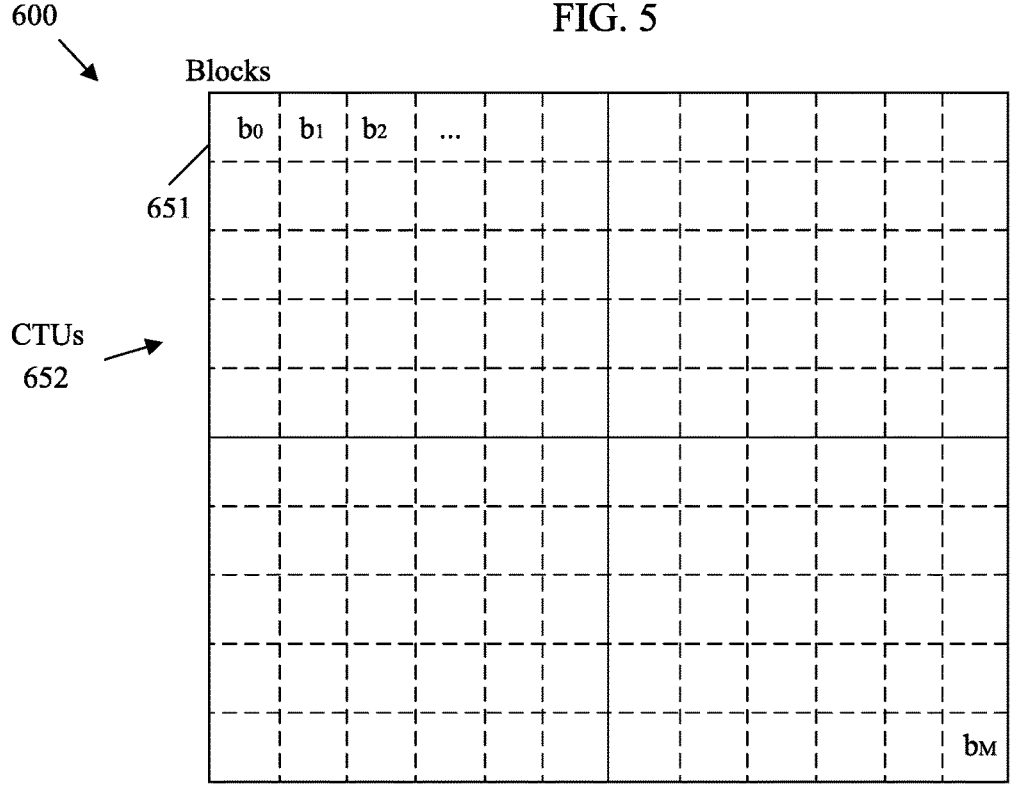
FIG. 6 is a schematic diagram illustrating an example of partitioning a reconstructed video frame for application of a noise suppression filter.

FIG. 6 is a schematic diagram illustrating an example of partitioning a reconstructed video frame 600 for application of a noise suppression filter, such as noise suppression filter 500. For example, the video frame 600 could be partitioned during noise suppression filtering in step 107 and/or 115 in method 100. Further, the video frame 600 may be partitioned by in-loop filters component 225, 325, and/or 425, depending on the example. Hence, the video frame 600 could be partitioned by an encoder 300 and/or a decoder 400.

Prior to filtering, the noise suppression filter partitions the reconstructed video frame into a plurality of blocks 651, denoted as $b_0$ to $b_m$ where m indicates a number of blocks, such as macroblocks. The blocks 651 are depicted with dashed lines. The noise suppression filter then matches the blocks 651 to create patches. Such patches are then analyzed to determine the noise suppression filter parameters, for example according to Equation 4 as discussed above. In order to match the blocks 651, the noise suppression filter compares each block 651 with the other blocks within a search range. The search range can be the entire reconstructed video frame 600 in some examples.

In other examples, the search range can be limited to reduce processing time. A reconstructed video frame 600 is partitioned during encoding/decoding at steps 103 and/or 111 in method 100. When the reconstructed video frame 600 is partitioned for encoding/decoding, the reconstructed video frame 600 may be partitioned into CTUs 652. The CTUs 652 are depicted in solid lines that partition the video frame 600.

A CTU 652 is a partitioning unit in HEVC. In some examples, the search range employed when matching the blocks to create patches is limited to remain inside a boundary of a corresponding CTU 652. The boundary of the CTU 652 is the boundary that was employed when the reconstructed video frame 600 was previously partitioned during encoding/decoding processes.

The noise suppression filter partitioning procedure creates a set of blocks 651 $B=\{b_1, b_2, \ldots, b_M\}$ which cover a reconstructed video frame 600. M is a number of blocks 651 and $b_i$ is an i-th reference block 651. For each reference block $b_i$, k closest blocks are found using a MSE metric in a noise suppression search range during a block matching procedure. The block matching procedure can be described according to Equation 16:

$$P_i = \text{BlockMatch}(S, b_i) = \{b_i, p_i^0, p_i^1, p_i^2, \ldots, p_i^{k-1}\}, \quad \text{Equation 16}$$

where S is the reconstructed video frame 600 and $p_i^j$ is a i-th patch corresponding to the $b_i$ reference block.

The block match function may employ one of several search patterns, such as a diamond search pattern or a square search pattern. A rectangular search pattern, such as a raster search may also be performed in some cases. In some examples, a noise suppression filter search range that bounds the block search during noise suppression filter partitioning can be transmitted in the bitstream. Table 11 below show example syntax for signaling a noise suppression filter partitioning search range in a slice header.

TABLE 11

| slice_segment_header( ) { | Descriptor |
|---|---|
| ... | |
| slice_ns_filter_enabled_flag | ue(v) |
| if (!slice_ns_filter_enabled_flag) { | |
| ns_search_range | ue(v) |
| log2_ns_block_size_minus3 | ue(v) |
| ... } | |
| ... | |
| } | |

The syntax in Table 11 is substantially similar to the syntax of Tables 3-11 above. However, ns_search_range is employed to specify that the noise suppression filter block matching is performed within a search range to find patches. Table 11 presumes that ns_search_range is signaled in the bitstream. However, in some examples, ns_search_range can be preset both at the decoder and the encoder. For example, ns_search_range could be preset to eighteen, which indicates the width and height of the search range is eighteen. In another example, the ns_search_range can be described by ns_search_width and ns_search_height, which indicate the noise suppression filter search range width and height range, respectively. Such flags can be signaled in the bitstream or predefined at the encoder and the decoder.

It should be noted that for each block 651 of size N×N (e.g., eight by eight) a set of similar blocks 651 can be found according to matching criterion (e.g., SAD, MSE, HAD, Sum of Absolute Transformed differences (SATD), etc.) within a search window set by the search filter range. This can be accomplished by employing block matching within the search window. The search window size of the N×N block is A×B (e.g., 18×18 or 32×18). When employing a search window range, the search window of the N×N block 651 may not extend outside the boundary of the CTU 652 to which the N×N block belongs.

Figure 7:
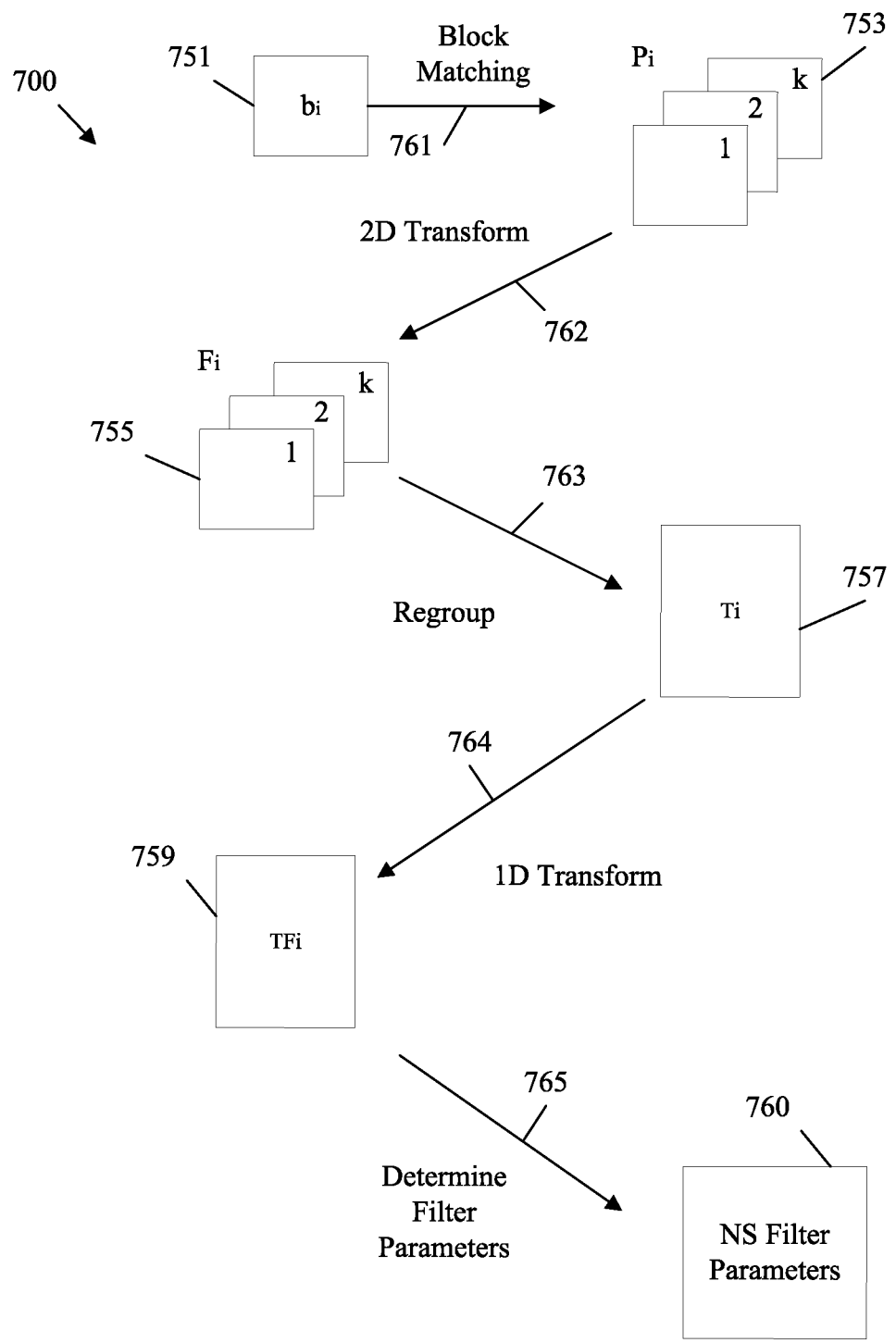
FIG. 7 is a flowchart of an example method of determining noise suppression filter parameters.

FIG. 7 is a flowchart of an example method 700 of determining noise suppression filter parameters, such as noise suppression filter parameters 547 according to Equations 1-15. Accordingly, method 700 may be implemented by a noise suppression filter 500 operating on a reconstructed video frame 600. Further, method 700 may be implemented as part of noise suppression filtering in step 107 and/or 115 in method 100. Also, method 700 may be implemented to perform noise suppression filtering as part of in-loop filters component 225, 325, and/or 425, depending on the example.

The noise suppression filter initially partitions the reconstructed video frame into a plurality of blocks 751, which are substantially similar to blocks 651. The blocks 751 may be partitioned according to Equation 17:

$$B=\{b_1, b_2, \ldots, b_M\} = \text{CreatePartitions}(\hat{S}, n), \quad \text{Equation 17}$$

where B is the reconstructed frame as bounded by any search range, where applicable, b1-bm are blocks 751, CreatePartitions is a partitioning function, S is the reconstructed frame as used in the partitioning function, and n is a number of partitions to create. The partitioning may result in a partitioned reconstructed video frame of blocks 751 such as partitioned reconstructed video frame 600.

A block matching 761 procedure is then performed to group similar blocks into patches. In this context, similar blocks are blocks that includes similar values, such as similar luma values, similar chroma values, etc. The block matching 761 procedure may be implemented according to Equation 16 as discussed with respect to FIG. 6. For example, a current block is compared to other blocks (e.g., within a search range) according to SAD, MSE, SATD, SSD or other statistical comparison of luma and/or chroma values in the blocks. The procedure iterates through the partitioned blocks 751 to create patches 753. Patches 753 may be denoted by $P_i$ where i is an index. Each block 751 $b_i$ may be associated with patches 753 $P_i$ including one to k other closest blocks according to the chosen statistical comparison.

Method 700 then invokes a procedure to build a three dimensional table of the patches 753. This may be accomplished according to Equation 18:

$$TF_i = \|tf_{vw}^i\| = \text{Build3dTable}(P_i), \quad \text{Equation 18}$$

where $TF_i$ is a transformed matrix of the patches $P_i$, by frequency, $tf_{vw}{}^i$ is a transformed matrix of the patches $P_i$ by frequency, and Build3dTable is a function as described by the following steps.

Specifically, the Build3dTable function applies a two dimensional (2D) transform 762 to the patches 753 $P_i$. This transforms the patches 753 $P_i$ into a frequency domain, and hence creates patch frequencies 755, denoted as $F_i$. For example, the patches 753 $P_i$ can be transformed into patch frequencies 755 by Equation 19:

$$F_i = \{f_i^0, f_i^1, f_i^2, \ldots, f_i^{k-1}\}, f_i^0 = 2D\ Tr(b_i), f_i^j = 2D\ Tr(p_i^j), j=1, k-1,$$

Equation 19 where 2D Tr is a two dimensional transform applied to patches 753 $P_i$ and/or blocks 751 $b_i$, j, k, and i are indices, $f_i^j$ are frequencies across the indexed patches 753 $P_i$ and/or blocks 751 $b_i$, and $F_i$ are the patch frequencies 755.

The Build3dTable function then regroups 763 the patch frequencies 755 into a matrix of patch frequencies 757, denoted as $T_i$. This creates a matrix of patch frequencies 757 $T_i$ where each row of the matrix $T_i$ includes components by spatial frequency. The regrouping 763 can be performed according to Equation 20:

$$T_i = \begin{pmatrix} t_1 \\ t_2 \\ \ldots \\ t_{n \times n} \end{pmatrix},$$

$$t_j = (f_i^0[v, w], f_i^1[v, w], \ldots, f_i^{k-1}[v, w]),$$

$$v = 0, n-1, w = 0, n-1,$$

Equation 20 where v and w are patch frequency indices from zero to n for frequencies $f_i^{k-1}$, and $t_j$ are patch frequency components arranged into a patch frequency matrix 757 $T_i$.

The Build3dTable function then applies an additional one dimensional (1D) transform 764 to convert the patch frequency matrix 757 $T_i$ into a transformed matrix of patch frequencies 759, denoted as $TF_i$, which can be employed to determine noise suppression filter parameters. For example, the 1D transform 764 can be applied to the patch frequency matrix 757 $T_i$ according to Equation 21:

$$TF_i = \begin{pmatrix} 1D\ Tr(t_1) \\ 1D\ Tr(t_2) \\ \ldots \\ 1D\ Tr(t_{n \times n}) \end{pmatrix},$$

Equation 21 where 1D Tr is a one dimensional transform applied to patch frequency components $t_1$ to $t_{n \times n}$ in the patch frequency matrix 757 $T_i$ to create a transformed matrix of patch frequencies 759 $TF_i$.

The method 700 can then employ the transformed matrix of patch frequencies 759 $TF_i$, to determine 765 noise suppression filter parameters 760. Specifically, the transformed matrix of patch frequencies 759 $TF_i$ can be denoted as $tf_{vw}{}^i(\Omega)$ where $\Omega$ is a column index of the transformed matrix, and hence indicates patch frequency. The noise suppression filter parameters 760, denoted as $g_{vw}{}^i(\Omega)$, can be determined 765 by employing the transformed matrix of patch frequencies 759 as index by $\Omega$ ($tf_{vw}{}^i(\Omega)$) by employing Equations 1-2 or Equations 3-4, as described above. The noise suppression filter parameters 760 can then be employed in a filter, such as a Wiener filter, to filter the reconstructed video frame.

In summary, method 700 can be employed to determine noise suppression filter parameters 760 by partitioning a reconstructed video frame into blocks 751, matching 761 the blocks 751 to create patches 753, and determining the noise suppression filter parameters 760 based on patches 753 of matched blocks 751 by creating a transformed matrix of patch frequencies 759. The noise suppression filter parameters can include a noise estimation parameter that is a function of patch frequency as discussed with respect to Equations 3-4 above.

Figure 8:
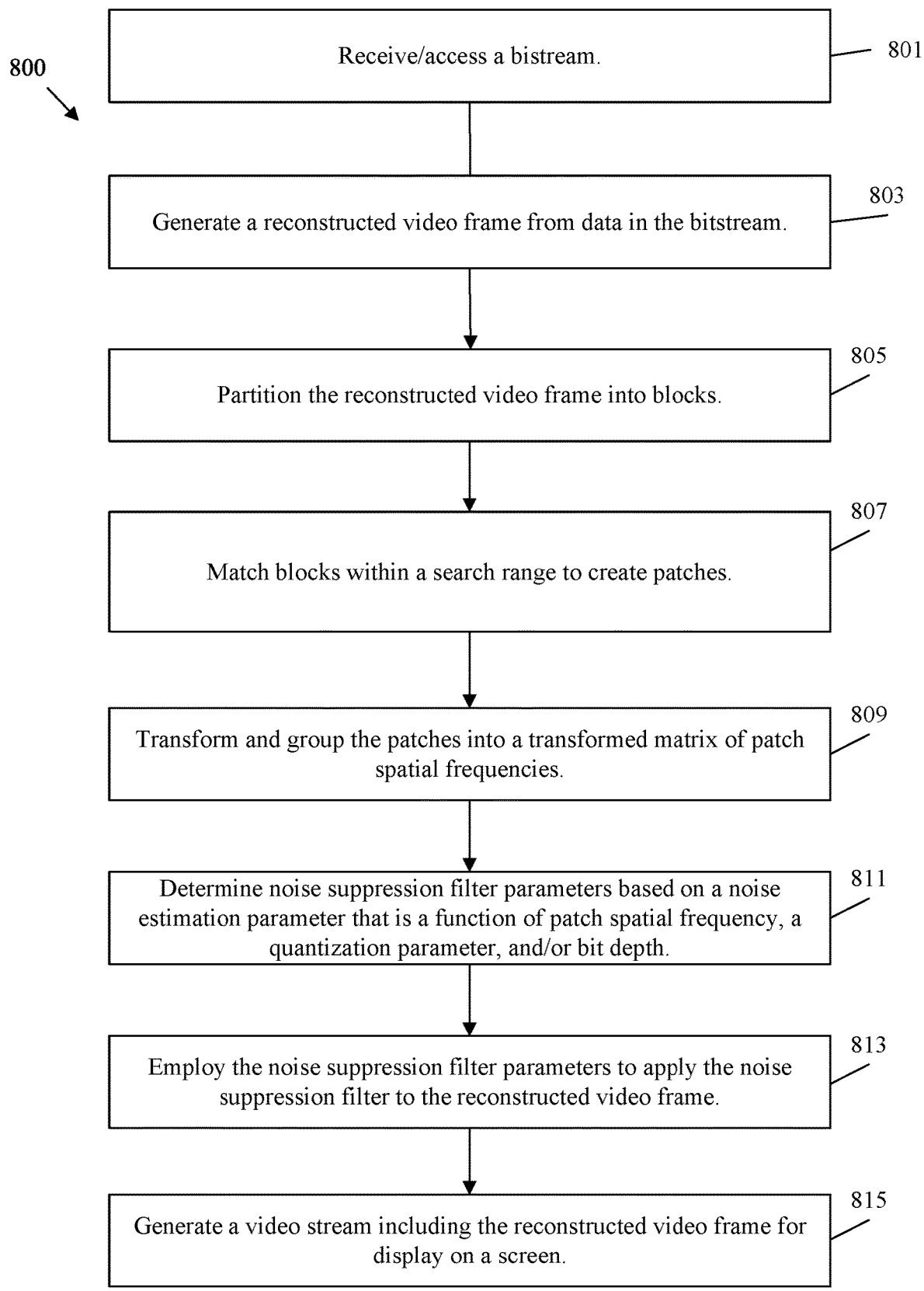
FIG. 8 is a flowchart of an example method of applying a noise suppression filter to a reconstructed video frame.

FIG. 8 is a flowchart of an example method 800 of applying a noise suppression filter to a reconstructed video frame, such as noise suppression filter parameters 547 according to Equations 1-15. Accordingly, method 800 may be implemented by a noise suppression filter 500 operating on a reconstructed video frame 600. Further, method 800 may be implemented as part of noise suppression filtering in step 107 and/or 115 in method 100. Also, method 800 may be implemented to perform noise suppression filtering as part of in-loop filters component 225, 325, and/or 425, depending on the example. In addition, method 800 may employ the items discussed with respect to method 700 to determine noise suppression filter parameters and apply such parameters to a reconstructed video frame.

At step 801, a bitstream is either received by a decoder or accessed by an encoder, depending on the example. For example, when operating on a decoder, the bitstream is received and accessed to obtain encoded video data. When operating on an encoder, encoded video data is accessed and obtained to serve as a reference frame for further encoding.

At step 803, a reconstructed video frame is generated from data in the bitstream (and/or stored in memory in the case of an encoder). For example, residual data, prediction data, and partition information related to an encoded frame are obtained. Such data is then employed to reconstruct the encoded video frame. The reconstructed video frame may contain visual artifacts caused by the encoding process. Accordingly, the reconstructed video frame is forwarded to a noise suppression filter for filtering out added noise.

At step 805, the noise suppression filter partitions the reconstructed video frame into blocks. In some examples, the reconstructed video frame is partitioned in a similar manner to the partitioning that occurs when the frame was originally encoded. In other examples, the partitioning by the noise suppression filter does not consider preceding partitioning by other processes.

At step 807, the blocks are matched to create patches. In some examples, the matching function employs a search range that limits searching/matching for the creation of patches to within certain boundaries. For example, the reconstructed video frame may be partitioned into CTUs when the frame is encoded. In some cases, a search range employed when matching the blocks to create patches is limited to remain inside a boundary of a corresponding CTU, for example as discussed with respect to FIG. 6 above. Such search ranges may be signaled in the bitstream, for example according to the syntax discussed in Table 11 above.

At step 809, the patches are grouped into a matrix and the matrix is transformed to create a transformed matrix of patch spatial frequencies, for example as discussed with respect to FIG. 7 above.

At step 811, the noise suppression filter parameters are determined based on the patches of matched blocks in the transformed matrix of patch spatial frequencies. The noise suppression filter parameters may be determined according to a noise estimation parameter that is a function of patch frequency. For example, the noise suppression filter parameters can be determined according to Equation 4 as discussed above, which is reproduced here for ease of discussion:

$$g_{vw}^i(\Omega) = \frac{tf_{vw}^i(\Omega)^2}{tf_{vw}^i(\Omega)^2 + N_{vw}^i(\Omega)^2}, \quad \text{Equation 4}$$

where $tf_{vw}^i(\Omega)$ is the transformed matrix of patch frequencies, i is a row index of the transformed matrix, $\Omega$ is a column index of the transformed matrix indicating patch frequency, v and w are patch frequency indices, $N_{vw}^i(\Omega)$ is the noise estimation parameter that is a function of patch frequency, and $g_{vw}^i(\Omega)$ are the noise suppression filter parameters. In some examples, the noise estimation parameter is a monotonically increasing function of patch frequency. In some examples, the noise estimation parameter is a monotonically non-increasing function of patch frequency. In some examples, the noise estimation parameter is a function of patch frequency range. In some examples, the noise estimation parameter is specified for each patch frequency index. Further, the noise estimation parameter can be any combination of the abovementioned examples.

At step 813, the noise suppression filter parameters determined at steps 805-811 are employed to apply a noise suppression filter, such as a Wiener filter, to the reconstructed video frame. Hence, the noise suppression filter parameters may be employed as Wiener filter parameters in some examples. Step 813 results at creating a filtered reconstructed video frame.

Step 815 is employed at a decoder. Specifically, the filtered reconstructed video frame of step 813 is employed in a video stream. For example, the video stream includes the reconstructed video frame and is sent toward a display device, such as a screen, for display to a user. When operating at an encoder, step 815 is not employed. Instead, the filtered reconstructed video frame of step 813 is employed as a reference frame for encoding additional frames for inter-prediction.

As discussed above, the noise suppression filter that applies to steps 803-813 may not be employed on all frames/frame slices. Accordingly, the noise suppression filter can be adaptively enabled and/or disabled for various frames and/or frame portions based on data included in a bitstream. Such information may be included in a SPS, a PPS, a slice header, or combination thereof. Such information can be signaled according to the syntax in any of the Tables 3-10 above. Accordingly, method 800 can be turned on/off for various video sequences, frames, and/or slices by such signaling.

Figure 9:
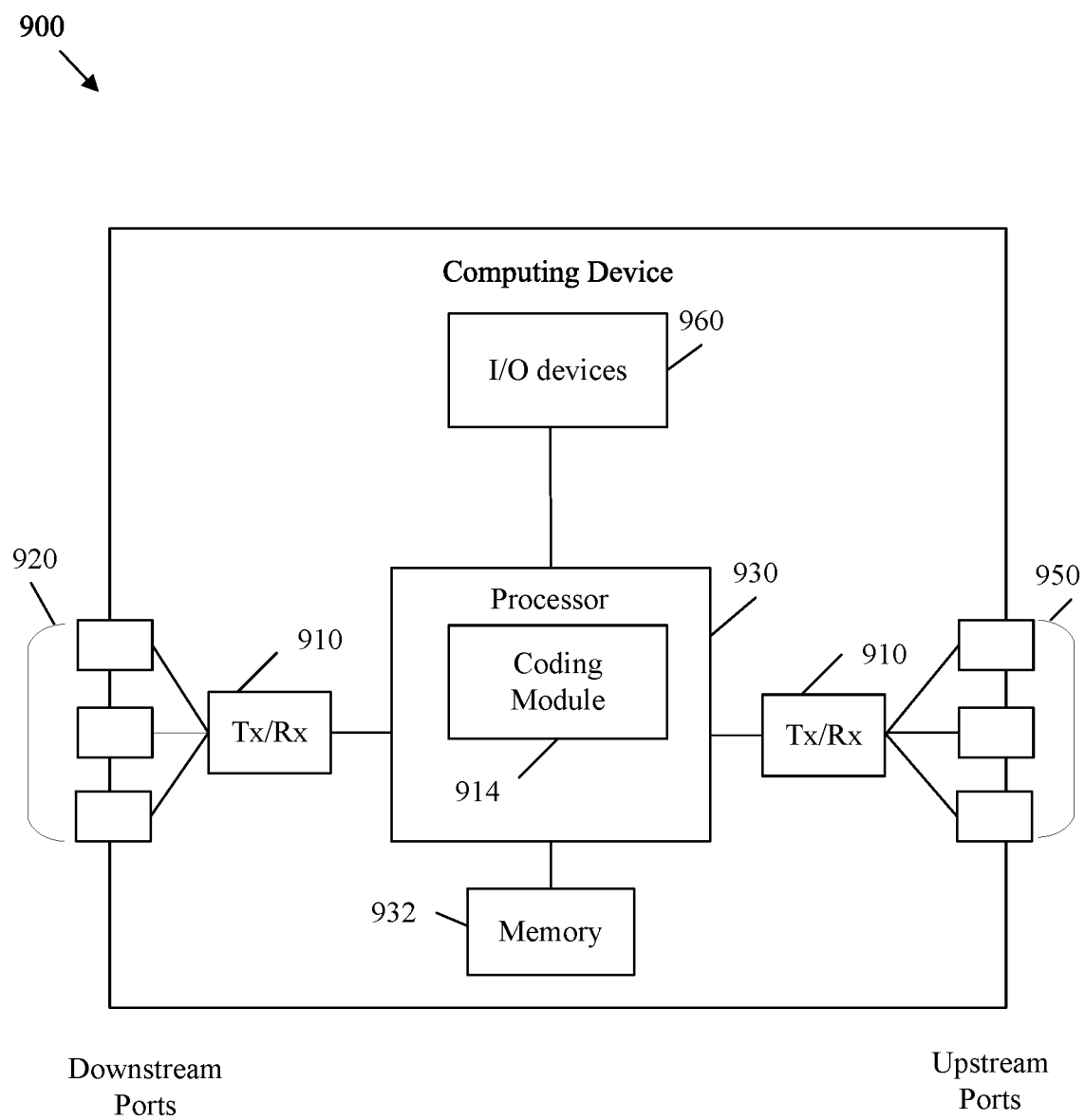
FIG. 9 is a schematic diagram of a computing device for video coding.

FIG. 9 is a schematic diagram of a computing device 900 for video coding according to an embodiment of the disclosure. The computing device 900 is suitable for implementing the disclosed embodiments/examples as described herein. The computing device 900 comprises downstream ports 920, upstream ports 950, and/or transceiver units (Tx/Rx) 910 for communicating data upstream and/or downstream over a network. The computing device 900 also includes a processor 930 including a logic unit and/or central processing unit (CPU) to process the data and a memory 932 for storing the data. The computing device 900 may also comprise optical-to-electrical (OE) components, electrical-to-optical (EO) components, and/or wireless communication components coupled to the upstream ports 950 and/or downstream ports 920 for communication of data via optical or wireless communication networks. The computing device 900 may also include input and/or output (I/O) devices 960 for communicating data to and from a user. The I/O devices 960 may include output devices such as a display for displaying video data, speakers for outputting audio data, etc. The I/O devices 960 may also include input devices, such as a keyboard, mouse, trackball, etc., and/or corresponding interfaces for interacting with such output devices.

The processor 930 is implemented by hardware and software. The processor 930 may be implemented as one or more CPU chips, cores (e.g., as a multi-core processor), field-programmable gate arrays (FPGAs), application specific integrated circuits (ASICs), and digital signal processors (DSPs). The processor 930 is in communication with the downstream ports 920, Tx/Rx units 910, upstream ports 950, and memory 932. The processor 930 comprises a coding module 914. The coding module 914 implements the disclosed embodiments described above, such as methods 100, 700, and/or 800. The coding module 914 may also implement noise suppression filter 500 for filtering a reconstructed video frame 600, as well as implement a codec system 200, an encoder 300, and/or a decoder 400, depending on the example. Accordingly, coding module 914 may employ any mechanism discussed above for determining noise suppression filter parameters including a noise estimation parameter operating as a function of patch frequency. Further, coding module 914 may employ any mechanism discussed above for adaptively applying a noise suppression filter to luma components, chroma components, or combinations thereof. Also, the coding module 914 may employ any mechanism discussed above for determining a quality parameter based on frequency. In addition, the coding module 914 may employ any mechanism discussed above for limiting the search range of the block matching process of the noise suppression filter to CTU boundaries of the reconstructed frame. The inclusion of the coding module 914 therefore provides a substantial improvement to the functionality of the computing device 900 and effects a transformation of the computing device 900 to a different state. Alternatively, the encoding/decoding module 914 can be implemented as instructions stored in the memory 932 and executed by the processor 930 (e.g., as a computer program product stored on a non-transitory medium).

The memory 932 comprises one or more memory types such as disks, tape drives, solid-state drives, read only memory (ROM), random access memory (RAM), flash memory, ternary content-addressable memory (TCAM), static random-access memory (SRAM), etc. The memory 932 may be used as an over-flow data storage device, to store programs when such programs are selected for execution, and to store instructions and data that are read during program execution.

The disclosure includes a computing device, comprising: a reconstruction module for generating a reconstructed video frame; a filter parameter module for determining noise suppression filter parameters by partitioning the reconstructed video frame into blocks, matching the blocks to create patches, and determining the noise suppression filter parameters based on patches of matched blocks by creating a transformed matrix of patch frequencies, the noise suppression filter parameters including a noise estimation parameter that is a function of patch frequency; and a noise suppression filter module for employing the noise suppression filter parameters to apply a noise suppression filter to the reconstructed video frame.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented in a computing device, the method comprising:
   generating, by a processor of the computing device, a reconstructed video frame;
   partitioning, by the processor, the reconstructed video frame into blocks;
   matching, by the processor, the blocks to create patches;
   creating, by the processor, a transformed matrix of patch frequencies;
   determining noise suppression filter parameters based on the transformed matrix of patch frequencies, the noise suppression filter parameters including a noise estimation parameter to estimate noise as a function of patch frequency, wherein patch frequency is a location of a certain element in a patch matrix, as expressed in a frequency domain, across the blocks in the patches;
   generating a noise suppression filter based on the noise suppression filter parameters; and
   applying the noise suppression filter to the reconstructed video frame.

2. The method of claim 1, wherein the noise suppression filter parameters are determined according to:

$$g_{vw}^i(\Omega) = \frac{tf_{vw}^i(\Omega)^2}{tf_{vw}^i(\Omega)^2 + N_{vw}^i(\Omega)^2},$$

where $tf_{vw}^i(\Omega)$ is the transformed matrix of patch frequencies, i is a row index of the transformed matrix, $\Omega$ is a column index of the transformed matrix indicating patch frequency, v and w are patch frequency indices, $N_{vw}^i(\Omega)$ is the noise estimation parameter that is a function of patch frequency, and $g_{vw}^i(\Omega)$ are the noise suppression filter parameters.

3. The method of claim 1, wherein the noise estimation parameter is a monotonically increasing function of patch frequency.

4. The method of claim 1, wherein the noise estimation parameter is a monotonically non-increasing function of patch frequency.

5. The method of claim 1, wherein the noise estimation parameter is a function of patch frequency range.

6. The method of claim 1, wherein the noise estimation parameter is specified for each patch frequency index.

7. The method of claim 1, wherein the noise suppression filter is adaptively enabled based on data included in a bitstream in a Sequence Parameter Set (SPS), a Picture Parameter Set (PPS), a slice header, or combination thereof.

8. The method of claim 1, wherein the reconstructed video frame is further partitioned into coding tree units (CTUs), and a search range employed when matching the blocks to create patches is limited to remain inside a boundary of a corresponding CTU.

9. An apparatus comprising:
   a receiver configured to receive a bitstream; and
   a processor coupled to the receiver, the processor configured to:
      generate a reconstructed video frame from data in the bitstream;
      partition the reconstructed video frame into blocks;
      match the blocks to create patches;
      create a transformed matrix of patch frequencies;
      determine noise suppression filter parameters based on the transformed matrix of patch frequencies, the noise suppression filter parameters including a noise estimation parameter that is a function of patch frequency, wherein the noise suppression filter parameters are determined according to:

$$g_{vw}^i(\Omega) = \frac{tf_{vw}^i(\Omega)^2}{tf_{vw}^i(\Omega)^2 + N_{vw}^i(\Omega)^2},$$

where $tf_{vw}^i(\Omega)$ is the transformed matrix of patch frequencies, i is a row index of the transformed matrix, $\Omega$ is a column index of the transformed matrix indicating patch frequency, v and w are patch frequency indices, $N_{vw}^i(\Omega)$ is the noise estimation parameter that is a function of patch frequency, and $g_{vw}^i(\Omega)$ are the noise suppression filter parameters;
      generate a noise suppression filter based on the noise suppression filter parameters; and
      apply the noise suppression filter to the reconstructed video frame.

10. The apparatus of claim 9, wherein the noise estimation parameter is a monotonically increasing function of patch frequency.

11. The apparatus of claim 9, wherein the noise estimation parameter is a monotonically non-increasing function of patch frequency.

12. The apparatus of claim 9, wherein the noise estimation parameter is specified for each patch frequency index.

13. The apparatus of claim 9, wherein the noise suppression filter is adaptively enabled based on data included in the bitstream in a Sequence Parameter Set (SPS), a Picture Parameter Set (PPS), a slice header, or combination thereof.

14. The apparatus of claim 9, wherein the processor is further configured to partition the reconstructed video frame into coding tree units (CTUs), and wherein a search range employed when matching the blocks to create patches is limited to remain inside a boundary of a corresponding CTU.

15. A non-transitory computer readable medium comprising a computer program product for use by a decoder, the computer program product comprising computer executable instructions stored on the non-transitory computer readable medium such that when executed by a processor cause the decoder to:

receive a bitstream;
generate a reconstructed video frame from data in the bitstream;
partition the reconstructed video frame into blocks;
match the blocks to create patches;
create a transformed matrix of patch frequencies;
determine noise suppression filter parameters based on the transformed matrix of patch frequencies, the noise suppression filter parameters including a noise estimation parameter that is a function of patch frequency, wherein the noise suppression filter parameters are determined according to:

$$g_{vw}^i(\Omega) = \frac{tf_{vw}^i(\Omega)^2}{tf_{vw}^i(\Omega)^2 + N_{vw}^i(\Omega)^2},$$

where $tf_{vw}^i(\Omega)$ is the transformed matrix of patch frequencies, i is a row index of the transformed matrix, $\Omega$ is a column index of the transformed matrix indicating patch frequency, v and w are patch frequency indices, $N_{vw}^i(\Omega)$ is the noise estimation parameter that is a function of patch frequency, and $g_{vw}^i(\Omega)$ are the noise suppression filter parameters;

generate a noise suppression filter based on the noise suppression filter parameters; and
apply the noise suppression filter to the reconstructed video frame.

16. The non-transitory computer readable medium of claim 15, wherein the noise estimation parameter is a function of patch frequency.

17. The non-transitory computer readable medium of claim 15, wherein the noise suppression filter is adaptively enabled based on data included in the bitstream in a Sequence Parameter Set (SPS), a Picture Parameter Set (PPS), a slice header, or combination thereof.

18. The non-transitory computer readable medium of claim 15, wherein the instructions further cause the processor to partition the reconstructed video frame into coding tree units (CTUs), and wherein a search range employed when matching the blocks to create patches is limited to remain inside a boundary of a corresponding CTU.

* * * * *

UNITED STATES PATENT AND TRADEMARK OFFICE
CERTIFICATE OF CORRECTION

PATENT NO. : 10,595,019 B2
APPLICATION NO. : 16/119016
DATED : March 17, 2020
INVENTOR(S) : Roman Chernyak et al.

Page 1 of 1

It is certified that error appears in the above-identified patent and that said Letters Patent is hereby corrected as shown below:

On the Title Page

Page 2, Other Publications, Column 2, Lines 21-23 should read:
OUDIN, S., et al., "Harmonization of the prediction and partitioning mode binarization of P and B slices," JCTVC-G1042, Nov. 21-30, 2011, 4 pages.

Page 2, Other Publications, Column 2, Lines 42-43 should read:
XU, X., et al., "Non-CE2: Intra BC merge mode with default candidates," JCTVC-S0123, Oct. 17-24, 2014, 7 pages.

Page 2, Other Publications, Column 2, Lines 44-45 should read:
XU, X., et al., "CE2 Test 3.2: Intra BC merge mode with default candidates," JCTVC-T0073, Feb. 10-18, 2015, 6 pages.

Signed and Sealed this
Twelfth Day of May, 2020

Andrei Iancu
*Director of the United States Patent and Trademark Office*